(12) United States Patent
Mahkonen et al.

(10) Patent No.: US 11,217,105 B2
(45) Date of Patent: *Jan. 4, 2022

(54) ENHANCED FLIGHT PLAN FOR UNMANNED TRAFFIC AIRCRAFT SYSTEMS

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 142 days.

This patent is subject to a terminal disclaimer.

(21) Appl. No.: 16/499,206

(22) PCT Filed: Dec. 12, 2017

(86) PCT No.: PCT/IB2017/057859
§ 371 (c)(1),
(2) Date: Sep. 27, 2019

(87) PCT Pub. No.: WO2018/178758
PCT Pub. Date: Oct. 4, 2018

(65) Prior Publication Data
US 2020/0105149 A1 Apr. 2, 2020

Related U.S. Application Data

(60) Provisional application No. 62/480,225, filed on Mar. 31, 2017.

(51) Int. Cl.
G08G 5/00 (2006.01)
B64C 39/02 (2006.01)
G08G 5/02 (2006.01)

(52) U.S. Cl.
CPC ......... *G08G 5/0039* (2013.01); *B64C 39/024* (2013.01); *G08G 5/006* (2013.01);
(Continued)

(58) Field of Classification Search
USPC .......................................................... 701/120
See application file for complete search history.

(56) References Cited

U.S. PATENT DOCUMENTS 7,813,326 B1 10/2010 Kelm et al.
9,363,690 B1 6/2016 Singh et al.
(Continued)

FOREIGN PATENT DOCUMENTS

CN 101836478 A 9/2010
CN 103914076 A 7/2014
(Continued)

OTHER PUBLICATIONS

Wikipedia, "Global Positioning System", available online at <https://en.wikipedia.org/w/index.php?title=Global_Positioning_System&oldid=917890871>, Sep. 26, 2019, 36 pages.
(Continued)

*Primary Examiner* — Tyler D Paige
(74) *Attorney, Agent, or Firm* — NDWE LLP

(57) ABSTRACT

A method for managing an Unmanned Aerial Vehicle (UAV) is described. The method includes receiving a flight plan that describes a proposed flight mission of the UAV in an airspace; adding one or more predefined points to the flight plan to create an enhanced flight plan, wherein each of the predefined points is associated with a set of conditions and a set of locations; and transmitting the enhanced flight plan to the UAV for storage of the predefined points on the UAV while the UAV carries out the proposed flight mission.

23 Claims, 15 Drawing Sheets

(52) U.S. Cl.
CPC ......... *G08G 5/0021* (2013.01); *G08G 5/0034* (2013.01); *G08G 5/0069* (2013.01); *G08G 5/0091* (2013.01); *B64C 2201/042* (2013.01); *B64C 2201/141* (2013.01)

(56) References Cited

U.S. PATENT DOCUMENTS

| | | |
|---|---|---|
| 9,412,278 B1 | 8/2016 | Gong et al. |
| 9,434,267 B2 | 9/2016 | Wang et al. |
| 9,467,922 B1 | 10/2016 | Buchmueller et al. |
| 9,537,561 B1 | 1/2017 | Kotecha et al. |
| 9,576,493 B2 | 2/2017 | Jarrell |
| 9,588,516 B1 | 3/2017 | Gurel et al. |
| 9,609,288 B1 | 3/2017 | Richman et al. |
| 9,709,409 B2 | 7/2017 | Dave et al. |
| 9,714,012 B1 | 7/2017 | Hoareau et al. |
| 9,764,703 B2 | 9/2017 | Hoareau et al. |
| 9,815,633 B1 | 11/2017 | Kisser et al. |
| 9,882,640 B1 | 1/2018 | Chaudhuri et al. |
| 9,950,814 B1 | 4/2018 | Beckman et al. |
| 10,023,309 B2 | 7/2018 | Brown |
| 10,142,019 B2 | 11/2018 | Chaudhuri et al. |
| 10,153,837 B2 | 12/2018 | Chaudhuri et al. |
| 10,195,952 B2 | 2/2019 | Wang et al. |
| 10,332,405 B2 | 6/2019 | Kopardekar |
| 10,363,826 B2 | 7/2019 | Wang |
| 10,373,487 B2 | 8/2019 | Kim et al. |
| 10,384,692 B2 | 8/2019 | Beckman et al. |
| 10,421,542 B2 | 9/2019 | Beckman et al. |
| 10,453,348 B2 | 10/2019 | Speasl et al. |
| 10,467,685 B1 | 11/2019 | Brisson et al. |
| 10,493,863 B1 | 12/2019 | Thrun et al. |
| 10,532,815 B1 | 1/2020 | Thrun et al. |
| 10,614,515 B1 | 4/2020 | Brisson et al. |
| 10,661,896 B2 | 5/2020 | Ozaki |
| 10,703,480 B1 | 7/2020 | Thrun et al. |
| 10,899,473 B2 | 1/2021 | Scherz |
| 10,953,754 B1 | 3/2021 | Wiegman |
| 10,974,911 B2 | 4/2021 | Zevenbergen et al. |
| 11,044,192 B2 | 6/2021 | Kim et al. |
| 2004/0156399 A1 | 8/2004 | Eran |
| 2007/0284474 A1 | 12/2007 | Olson et al. |
| 2010/0062774 A1 | 3/2010 | Motegi et al. |
| 2010/0085236 A1 | 4/2010 | Franceschini et al. |
| 2010/0153001 A1 | 6/2010 | Bauchot et al. |
| 2010/0254346 A1 | 10/2010 | Jain et al. |
| 2012/0225675 A1 | 9/2012 | Nishida et al. |
| 2014/0032034 A1 | 1/2014 | Raptopoulos et al. |
| 2015/0038140 A1 | 2/2015 | Kilpatrick et al. |
| 2015/0119043 A1 | 4/2015 | Gopal et al. |
| 2015/0142211 A1 | 5/2015 | Shehata et al. |
| 2015/0208300 A1 | 7/2015 | McLaughlin et al. |
| 2015/0312813 A1 | 10/2015 | Xu et al. |
| 2016/0065345 A1 | 3/2016 | Kim et al. |
| 2016/0070265 A1 | 3/2016 | Liu et al. |
| 2016/0117931 A1 | 4/2016 | Chan et al. |
| 2016/0125740 A1 | 5/2016 | Pasko et al. |
| 2016/0140851 A1 | 5/2016 | Levy et al. |
| 2016/0142211 A1 | 5/2016 | Metke et al. |
| 2016/0142944 A1 | 5/2016 | Cao |
| 2016/0142994 A1 | 5/2016 | Luo et al. |
| 2016/0161258 A1 | 6/2016 | Magson et al. |
| 2016/0200421 A1 | 7/2016 | Morrison |
| 2016/0253907 A1 | 9/2016 | Taveira |
| 2016/0266579 A1 | 9/2016 | Chen et al. |
| 2016/0270062 A1 | 9/2016 | Dinan |
| 2016/0284221 A1 | 9/2016 | Hinkle et al. |
| 2016/0292403 A1 | 10/2016 | Gong et al. |
| 2016/0300493 A1 | 10/2016 | Ubhi et al. |
| 2016/0300495 A1 | 10/2016 | Kantor et al. |
| 2016/0358187 A1 | 12/2016 | Radocchia et al. |
| 2016/0363929 A1 | 12/2016 | Clark et al. |
| 2016/0371985 A1 | 12/2016 | Kotecha |
| 2016/0371987 A1 | 12/2016 | Kotecha |
| 2016/0380692 A1 | 12/2016 | Jalali et al. |
| 2017/0023939 A1 | 1/2017 | Leonard et al. |
| 2017/0045884 A1 | 2/2017 | Kablaoui |
| 2017/0063445 A1 | 3/2017 | Feria et al. |
| 2017/0069214 A1 | 3/2017 | Dupray et al. |
| 2017/0092137 A1 | 3/2017 | Hiebl |
| 2017/0124884 A1 | 5/2017 | Shaw et al. |
| 2017/0142766 A1 | 5/2017 | Kim |
| 2017/0150373 A1 | 5/2017 | Brennan et al. |
| 2017/0168480 A1 | 6/2017 | Wanstedt et al. |
| 2017/0295458 A1 | 10/2017 | Gao et al. |
| 2017/0323572 A1 | 11/2017 | Chan et al. |
| 2017/0374572 A1 | 12/2017 | Kleinbeck et al. |
| 2018/0086456 A1 | 3/2018 | Burch et al. |
| 2018/0086483 A1* | 3/2018 | Priest .................. G08G 5/0095 |
| 2018/0152510 A1 | 5/2018 | Newton et al. |
| 2018/0206083 A1 | 7/2018 | Kumar et al. |
| 2018/0247544 A1* | 8/2018 | Mustafic ............... H04W 36/32 |
| 2018/0279348 A1 | 9/2018 | Huang et al. |
| 2019/0012923 A1 | 1/2019 | Weisbrod et al. |
| 2019/0087576 A1* | 3/2019 | Olson ..................... G06F 7/00 |
| 2019/0149417 A1 | 5/2019 | Augusto et al. |
| 2019/0289505 A1 | 9/2019 | Thomas et al. |
| 2019/0329877 A1 | 10/2019 | Benson et al. |
| 2019/0364492 A1 | 11/2019 | Azizi et al. |
| 2020/0005651 A1* | 1/2020 | Priest .................. G08G 5/0039 |
| 2020/0105149 A1* | 4/2020 | Mahkonen ........... G08G 5/0013 |
| 2020/0193844 A1* | 6/2020 | Mahkonen ........... G08G 5/0052 |
| 2020/0301445 A1 | 9/2020 | Jourdan et al. |

FOREIGN PATENT DOCUMENTS

| | | |
|---|---|---|
| CN | 104053195 A | 9/2014 |
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3251108 A1 | 12/2017 |
| EP | 3349085 A1 | 7/2018 |
| EP | 3251108 B1 | 7/2019 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/122780 A1 | 8/2016 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

Office Action, TW App. No. 107115169, dated Apr. 22, 2019, 9 pages (2 pages of Partial English Translation and 7 pages of Original Document).

Office Action, TW App. No. 107115169, dated Nov. 28, 2018, 17 pages (8 pages of English Translation and 9 pages of Original Document).

International Search Report and Written Opinion for Application No. PCT/IB2017/057859, dated Jun. 12, 2018, 21 pages.

3GPP TS 23.203 V12.6.0, 3rd Generation Partnership Project, Technical Specification Group Services and System Aspects, Policy and charging control architecture, (Release 12), Sep. 2014, 220 pages.

3GPP TS 23.203 V14.2.0, 3rd Generation Partnership Project, Technical Specification Group Services and System Aspects, Policy and charging control architecture, (Release 14), Dec. 2016, 256 pages.

3GPP TS 23.271 V14.0.0, 3rd Generation Partnership Project, Technical Specification Group Services and System Aspects, Func-

(56) References Cited

OTHER PUBLICATIONS tional stage 2 description of Location Services (LCS), (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Curran et al., "Location Based Predictive Handoff Algorithm for Mobile Networks," Advances in Intelligent IT: Active Media Technology, May 2006, pp. 86-91.
Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitre.org/sites/default/files/publications/16-4497-AIAA-2017-ADS-B.pdf>, 2017, 15 pages.
Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.
Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
IEEE Std 802.11 (Trademark)-2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.
International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/053641, dated Nov. 22, 2017, 11 pages.
International Search Report and Written Opinion for Application No. PCT/IB2017/054160, dated Mar. 13, 2018, 16 pages.
International Search Report and Written Opinion for Application No. PCT/IB2017/054252, dated Jan. 3, 2018, 11 pages.
International Search Report and Written Opinion for Application No. PCT/IB2017/057810, dated Mar. 13, 2018, 10 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
International Search Report and Written Opinion, PCT App. No. PCT/US2017/050046, dated Dec. 13, 2017, 13 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP TSG-RAN WG2 Meeting #98, *2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPP SYNC/RAN2/Docs/.
MAVLINK Common Message set specifications, available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages.
Qualcomm, LTE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
Second Written Opinion for Application No. PCT/IB2017/054160, dated Jun. 7, 2019, 15 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.

\* cited by examiner

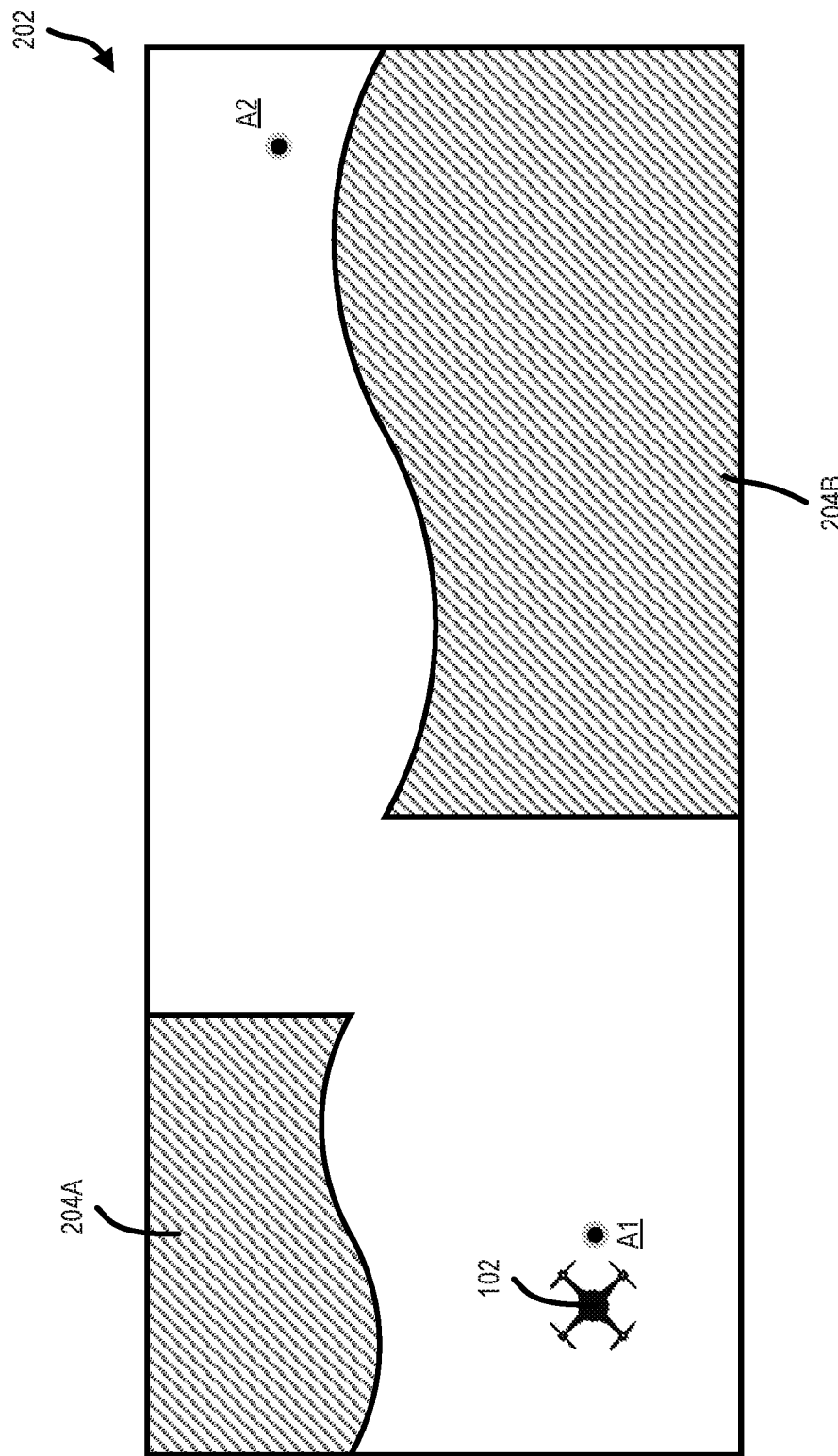

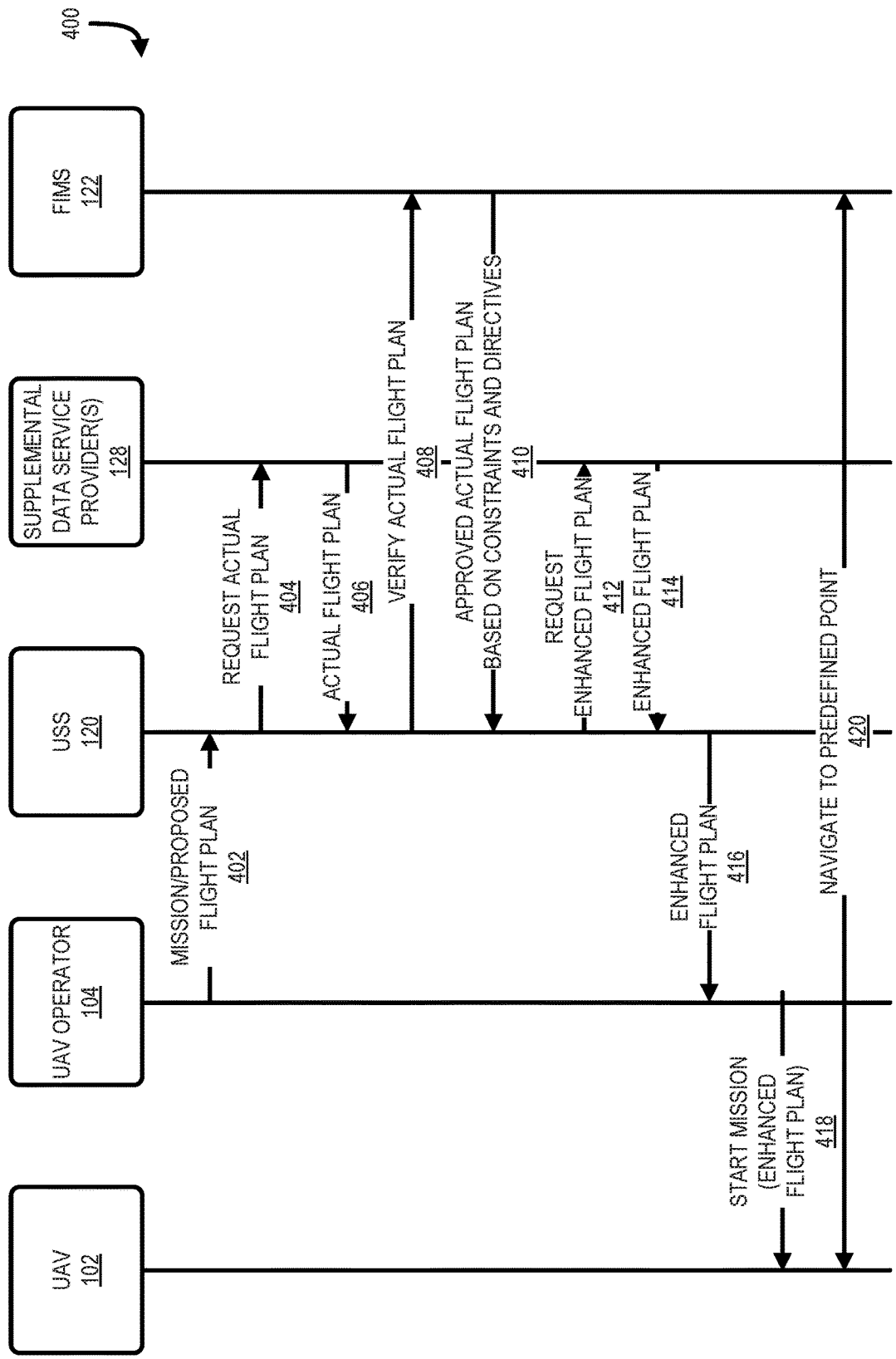

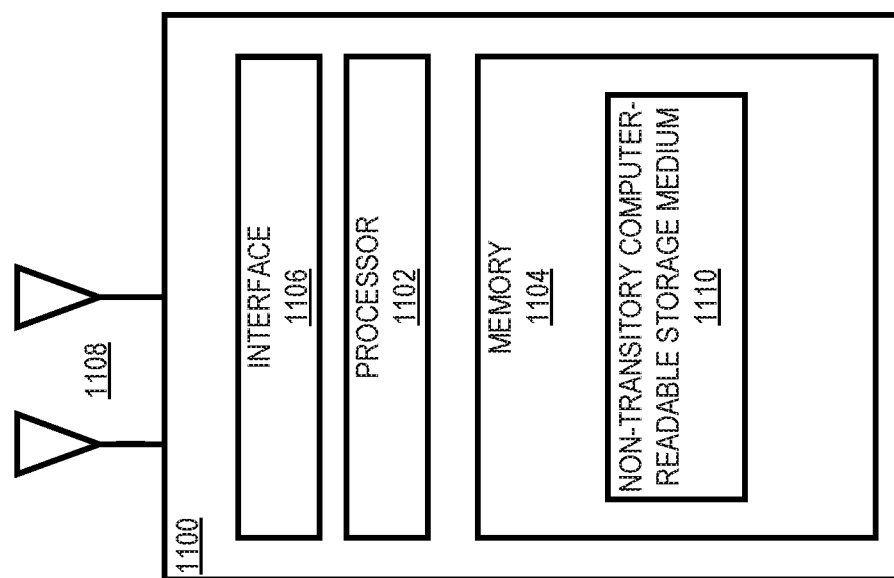

ENHANCED FLIGHT PLAN FOR UNMANNED TRAFFIC AIRCRAFT SYSTEMS

CROSS-REFERENCE TO RELATED APPLICATIONS

This application is a national stage of International Application No. PCT/IB2017/057859, filed Dec. 12, 2017, which claims the benefit of U.S. Provisional Application No. 62/480,225, filed Mar. 31, 2017, which are hereby incorporated by reference.

FIELD

Embodiments of the invention relate to the field of managing Unmanned Aerial Vehicles (UAVs); and more specifically, to managing UAVs in an UAV Traffic Management (UTM) framework by adding predefined points to a flight plan of the UAV.

BACKGROUND

There is increasing interest in using Unmanned Aerial Vehicle's (UAVs) for a wide variety of applications throughout society and, in particular, small UAVs (sUAVs). Examples include delivery services, aerial photography and film making, remote sensing tasks for agriculture, city planning, civil engineering, and support for public safety and rescue services. These applications all involve the use of UAVs operating at low altitudes and often above urban areas. In some situations, the UAVs are manually flown by their operator while in other situations the UAVs may be flown using some level of autonomy where a human operator monitors multiple aircraft and intervenes only when trouble arises.

With more aircraft in operation, possibly being flown autonomously or controlled from a remote location, monitoring, controlling, and planning air traffic becomes an important and complex issue. This level of traffic management requires an air traffic control system that can (1) handle both manually flown (remote or onsite control) and autonomous UAVs, (2) integrate with existing air traffic control systems to ensure safe operations with other systems flying in the same airspace, (3) distribute relevant information to all parties/stakeholders, including making operators aware of the environment around the aircraft they are flying (e.g., who is flying where, their planned route, temporary obstacles, weather situations, etc.), and (4) allow regulatory authorities the ability to monitor the airspace, reserve or restrict airspace access, or close the airspace entirely.

Overall system efficiency will suffer if a human air traffic controller must be involved in handling each request from UAV operators. Many tasks can be performed and verified automatically by air traffic control computers, including registering flight plans, computing flight plans, approving altitude changes, and general flight monitoring. With greater automation, air traffic may be streamlined and human controllers may be assigned to handle more UAV flights.

However, current UAVs provide little automation when unexpected issues arise. In particular, current UAVs are programmed with a single default emergency action of either grounding or aborting the current mission in progress and returning home. The emergency action is triggered primarily by the drop of battery level or the loss of connectivity over a command and control (C2) connection with the UAV operator. However, there may be numerous other triggers for aborting flight missions (e.g., meteorological disturbances). Thus, a single emergency action is insufficient to cover all possible flight issues. Further, safe grounding of a UAV can be called into question when the mission is being flown over a body of water or over hostile or hazardous terrain. Moreover, UAV operators are also mandated to be mindful of "no fly zones" (e.g., restricted airspaces, such as airports or other areas of national security interest). These restrictions are fed into flight path calculations, which are typically performed manually or by UAV Traffic Management (UTM) systems. However, these restrictions are not considered when emergency actions are taken by UAVs. Accordingly, as described above, current UAV flight management systems fail to properly and efficiently address the large number of unexpected issues that may arise during the course of a UAV flight. Consequently, these unexpected issues require the intervention from a human flight traffic controller and/or a human UAV operator.

SUMMARY

A method for managing an Unmanned Aerial Vehicle (UAV) according to one embodiment is described. The method includes receiving a flight plan that describes a proposed flight mission of the UAV in an airspace; adding one or more predefined points to the flight plan to create an enhanced flight plan, wherein each of the predefined points is associated with a set of conditions and a set of locations; and transmitting the enhanced flight plan to the UAV for storage of the predefined points on the UAV while the UAV carries out the proposed flight mission.

As described above, an enhanced flight plan, including the predefined points, may be delivered to and stored on the UAV such that upon encountering an unexpected issue during a flight, the UAV may autonomously and dynamically alter a flight path based on a corresponding predefined point. By providing flexible and extensible enhancements to the permission to use an airspace, UAVs can leverage information for a safer and a friendlier flight mission with minimum interaction with an UAV Traffic Management (UTM) system, air traffic controllers, and/or a UAV operator. This framework may yield to many more successfully completed flight missions in a safer and friendlier environment thereby leading to an efficient use of the airspace.

BRIEF DESCRIPTION OF THE DRAWINGS

The invention may best be understood by referring to the following description and accompanying drawings that are used to illustrate embodiments of the invention. In the drawings:

FIG. 2B illustrates an example flight plan with a set of restricted areas/zones according to one embodiment;

FIG. 4 illustrates a method for generating a flight plan according to one embodiment;

FIG. 11 illustrates a computing/networking device according to one embodiment.

DESCRIPTION OF EMBODIMENTS

Figure 1:
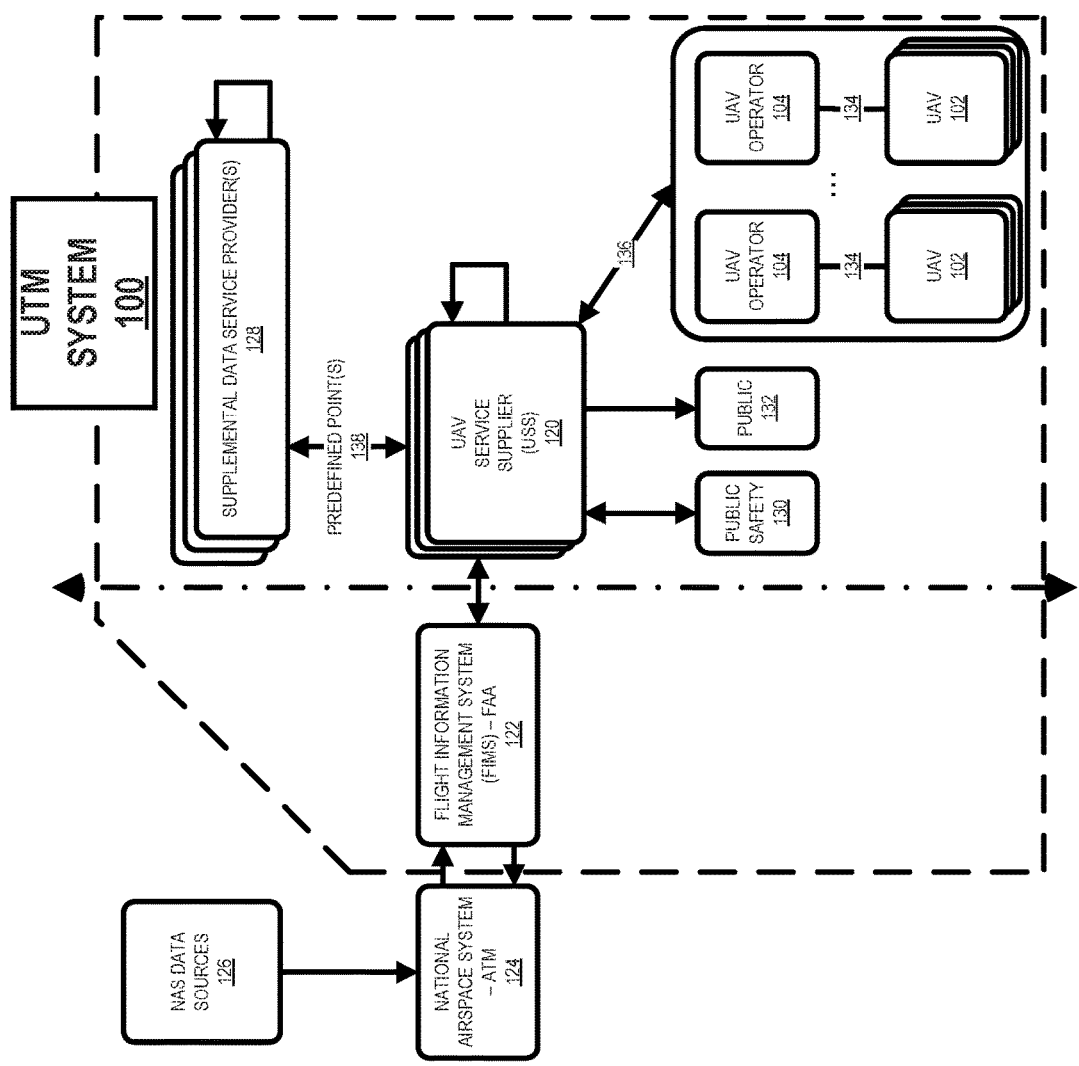
FIG. 1 illustrates an Unmanned Aerial Vehicle (UAV) Traffic Management (UTM) system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A system, according to one embodiment, is presented herein that enhances a flight plan for Unmanned Aerial Vehicles (UAVs) by incorporating/adding predefined points to the flight plan. In one embodiment, a UAV operator may present a proposed flight plan, including a flight path, to a UAV Traffic Management (UTM) system. The UTM system may generate an actual flight plan based on the proposed flight plan and verify that the actual flight plan complies with directives, constraints, or other rules/regulations issued by a regulatory authority and/or other stakeholders/services. In some embodiments, a supplemental data service provider may make a set of predefined points available for modifying the actual flight plan to produce an enhanced flight plan. In these embodiments, the enhanced flight plan includes at least a main flight path (taken from the actual flight plan) and a set of predefined points. In one embodiment, each of the predefined points may include a set of conditions and a set of locations. For example, a predefined point may include a low battery condition (e.g., the battery of the UAV is below ten percent) and a set of charging station locations associated with the low battery condition. In this example embodiment, upon detection of the low battery condition, the UAV may autonomously select one of the charging station locations and deviate from the main flight path to navigate to the selected charging station location. The enhanced flight plan, including at least the predefined points, may be delivered to and stored on the UAV such that upon encountering an unexpected issue during a flight (i.e., an issue matching a condition of a predefined point), the UAV may autonomously and dynamically alter its flight (e.g., deviate from the main flight path) based on a corresponding predefined point. By providing flexible and extensible enhancements to the permission to use an airspace, UAVs can leverage information for a safer and a friendlier flight mission with minimum interaction with the UTM, air traffic controllers, and/or a UAV operator. This framework may yield to many more successfully completed flight missions in a safer and friendlier environment thereby leading to an efficient use of the airspace.

FIG. 1 shows an Unmanned Aerial Vehicle (UAV) Traffic Management (UTM) system 100 for managing UAVs 102 using enhanced flight plans, according to one embodiment. The UTM system 100 may be used for managing the flights of one or more UAVs 102 that are controlled/operated/piloted by corresponding UAV operators 104. The UAVs 102 may be interchangeably referred to as Unmanned Aircraft Systems (UASs) or drones throughout this description.

In some embodiments, the UAVs 102 may be miniature or small UAVs (sUAVs), which are unmanned aircraft that are small enough to be considered portable by an average man and typically operate/cruise at altitudes lower than larger aircraft. For example, a small UAS may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 102 larger than fifty-five pounds and/or UAVs 102 that are designed to fly above 400 feet.

The UAVs 102 are aircraft without an onboard human controller. Instead, the UAVs 102 may be operated/piloted using various degrees of autonomy. For example, a UAV 102 may be operated by a human (e.g., the UAV operator 104) located on the ground or otherwise removed and independent of the location of the UAV 102. For instance, a UAV operator 104 may be located on the ground and acts to directly control each movement of a UAV 102 or a group of UAVs 102 through a radio control interface (e.g., a command and control (C2) interface). In this embodiment, the UAV operator 104 may transmit commands via the radio interface to cause the UAV 102 to adjust/move particular flight instruments (e.g., flaps, blades, motors, rotors, etc.) for the purpose of following a flight plan or another set of objectives. In other scenarios, the UAV operator 104 may provide a flight plan to the UAV 102. In response to the flight plan, the UAV 102 may adjust/move particular flight instruments to autonomously fulfill objectives of the flight plan. In these embodiments, a human operator (e.g., the UAV operator 104) may monitor the progress of the flight plan and intervene as needed or as directed. Accordingly, the UAV 102 may operate with various levels of autonomy (e.g., fully dependent on a UAV operator 104, partially dependent on a UAV operator 104, or fully independent of a UAV operator 104). In some embodiments, the UAV operator 104 may be viewed as a remote human controller, a remote digital controller, an onboard digital controller, or a combination of the preceding.

Figure 2A:
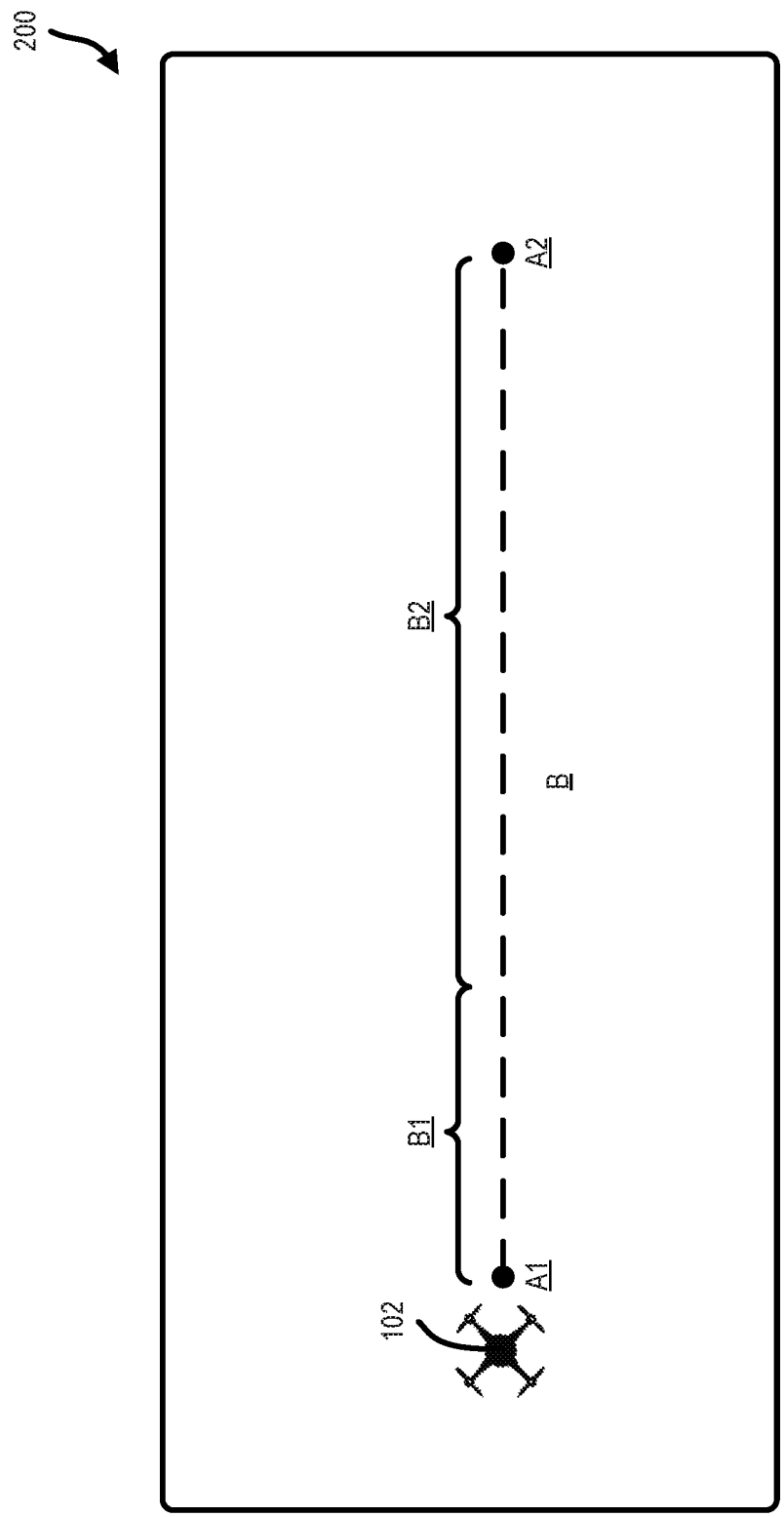
FIG. 2A illustrates an example flight plan with a set of coordinates according to one embodiment.

In some embodiments, a flight plan may include a flight path (e.g., a starting point, an ending point, and/or a set of waypoints, where each are defined by longitudinal and latitudinal coordinates), a set of velocities, a set of altitudes, a set of headings/directions, a mission type, a set of events (e.g., capture video at prescribed times or locations, hover over an area for a specified interval, etc.), a time/expiration/duration, and a set of restricted or permitted zones/areas. For instance, the flight plan 200 shown in FIG. 2A indicates that the UAV 102 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 102 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 102 (e.g., altitude limitations above 400 feet and velocity limitations above 100 miles/hour).

In another example, as shown in FIG. 2B, a flight plan 202 may indicate that the UAV 102 is to take off from location A1, travel to location A2, and avoid a set of restricted zones 204A and 204B. In this example, the UAV 102 is directed to reach the target location A2 without entering the set of restricted zones 204A and 204B. The restricted zones may be relative to geographical location (defined by a set of coordinates), an altitude, and/or a velocity. For example, the UAV 102 may be permitted to enter restricted zone 204A but only at a prescribed altitude and/or only at a prescribed velocity.

Figure 2C:
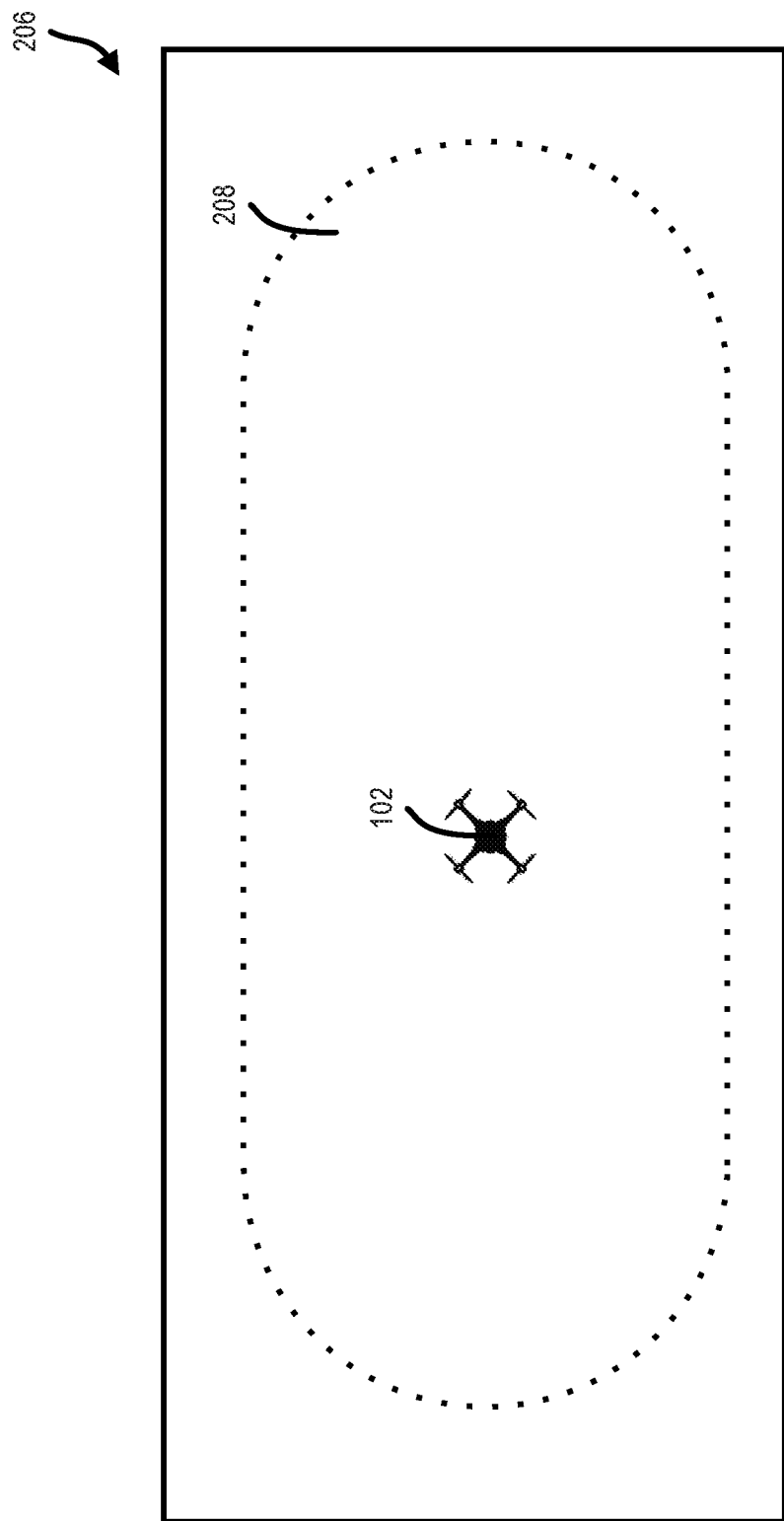
FIG. 2C illustrates an example flight plan with a designated clearance zone according to one embodiment.

In still another example, shown in FIG. 2C, a flight plan 206 may provide clearance for the UAV 102 to fly in a designated clearance zone 208. The clearance zone 208 may be a confined area associated with an altitude range (e.g., between 400-500 feet) and/or an expiration/duration (e.g., an expiration of 11:40 PM). In this example, the UAV 102 may fly anywhere in the designated clearance zone 208 until the clearance has expired.

Figure 2D:
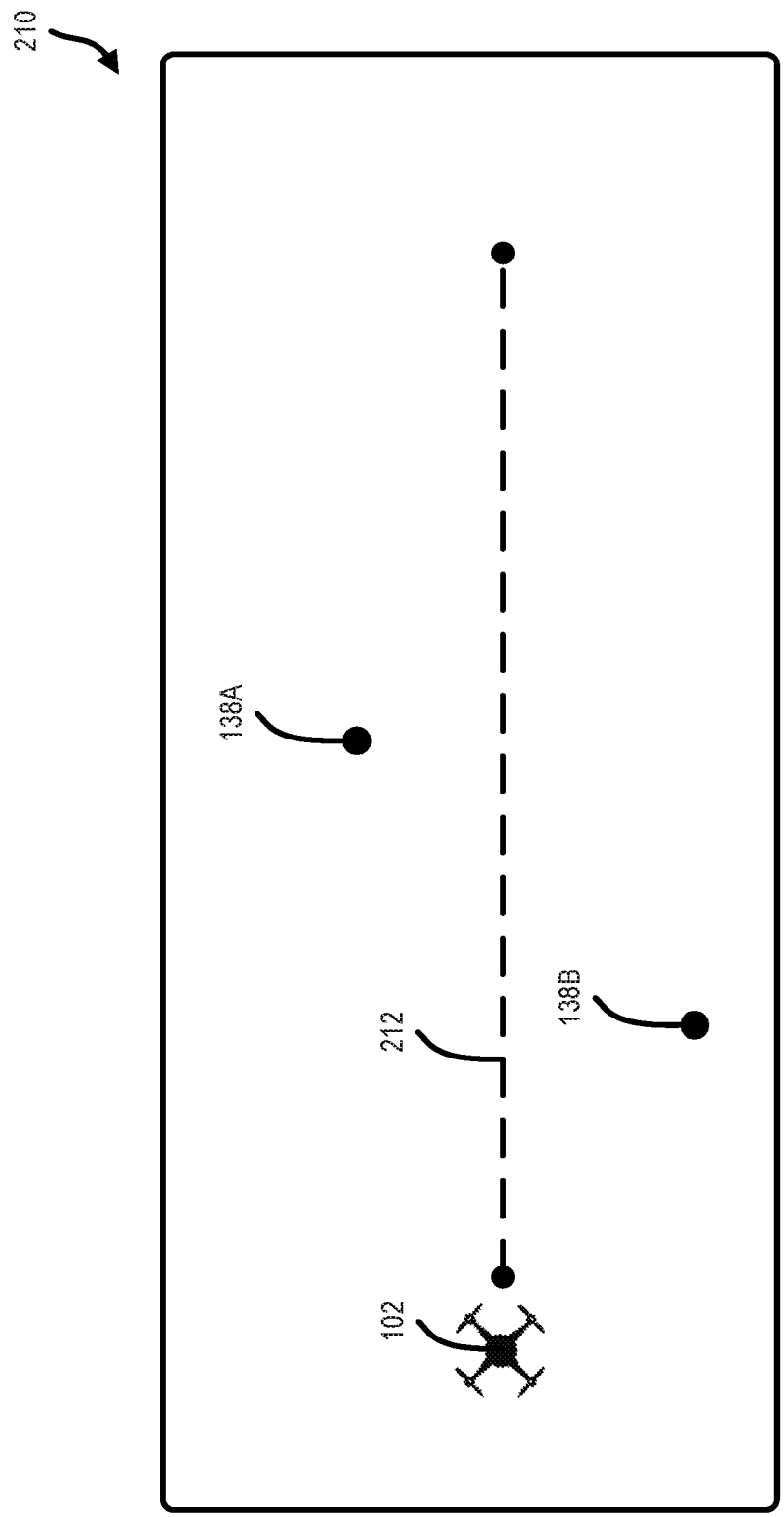
FIG. 2D illustrates an example flight plan with predefined points according to one embodiment.

In yet another example, shown in FIG. 2D, the flight plan 210 may include a main flight path 212 and a set of predefined points 138A and 138B. In this example embodiment, the UAV 102 may follow the main flight path 212 and upon detection/occurrence of a condition associated with a predefined point 138A and 138B, the UAV 102 may move off or otherwise deviate from the main flight path 212 and to the corresponding location of the predefined point 138A or 138B. For instance, the predefined point 138A may be associated with a low charge condition. The low charge condition may be related to a battery charge of a battery in the UAV 102 falling below a prescribed level (e.g., battery level is less than 20%). In this example, the predefined point 138A may also include a charging station location. Upon detecting the low battery condition (e.g., the battery level is less than 20%), the UAV 102 may autonomously adjust course away from the main flight path 212 to move to the charging station location of the predefined point 138A. In some embodiments, after the condition is no longer detected or is otherwise no longer true, the UAV 102 may return to the main flight path 212.

Although the flight plans described above are provided in relation to diagrams, flight plans may be encoded/presented using any format. For example, a flight plan may be represented and passed to the UAV 102 using an extensible markup language (XML) based format or another encoding or representation that is decodable and parseable by a machine.

Figure 3:
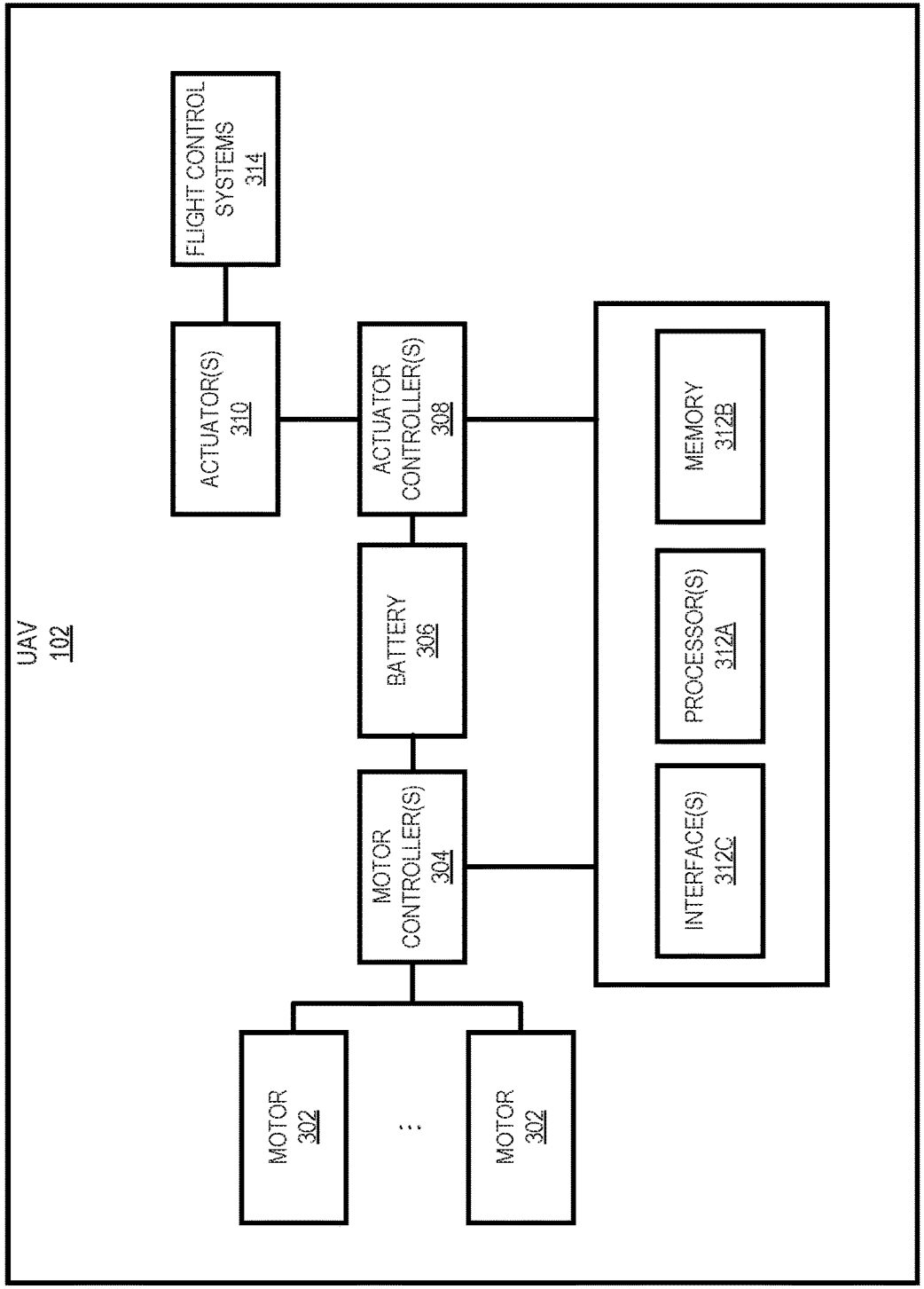
FIG. 3 illustrates a block diagram of a UAV according to one embodiment.

FIG. 3 shows a block diagram of a UAV 102 according to one example embodiment. Each element of the UAV 102 will be described by way of example below and it is understood that each UAV 102 may include more or less components than those shown and described herein.

As shown in FIG. 3, a UAV 102 may include a set of motors 302 controlled by one or more motor controllers 304, which control the speed of rotation of the motors 302 (e.g., rounds per minute). As used herein, the term engine may be used synonymously with the term motor and shall designate a machine that converts one form of energy into mechanical energy. For example, the motors 302 may be electrical motors that convert electricity stored in the battery 306 into mechanical energy. The UAV 102 may include any number of motors 302 that are placed in any configuration relative to a body and/or an expected heading of the UAV 102. For example, the motors 302 may be configured such that the UAV 102 is a multirotor helicopter (e.g., a quadcopter). In other embodiments, the motors 302 may be configured such that the UAV 102 is a fixed wing aircraft (e.g., a single engine or dual engine airplane). In these embodiments, the motors 302, in conjunction with other elements of the UAV 102 serve to keep the UAV 102 in flight and/or propel the UAV 102 in a desired direction. In some embodiments, the UAV 102 may not include motors 302 for propelling the UAV 102 forward. In this embodiment, the UAV 102 may be a glider or lighter than air craft (e.g., a weather balloon).

As noted above, the motors 302 are controlled by one or more motor controllers 304, which govern the speed of rotation of each motor 302. In one embodiment, the motor controllers 304 may work in conjunction with actuator controllers 308 and actuators 310 that control the pitch/angle/rotation of propellers, flaps, slats, slots, rotors, rotor blades/wings, and other flight control systems 314. The motor controllers 304 and actuator controllers 308 may be managed/controlled by one or more processors 312A that are communicatively coupled to a memory 312B and one or more interfaces 312C.

In some embodiments, the memory 312B may store instructions that when executed by the processors 312A cause the UAV 102, via adjustments to settings/parameters of the motor controllers 304 and actuator controllers 308, to move in a particular direction (vertical or horizontal) or maintain a particular flight pattern (e.g., hover at a particular altitude).

The UAV 102 may communicate with one or more other devices using the one or more interfaces 312C. In one embodiment, one of the interfaces 312C in a UAV 102 may comply with a 3rd Generation Partnership Project (3GPP) protocol. For example, the interface 312C may adhere to one or more of Global System for Mobile communications (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 312C in the UAV 102 may allow a UAV operator 104 and/or other parts of the UTM system 100 to control or provide plans/instructions to the UAV 102.

In one embodiment, one of the interfaces 312C provides access to location information describing the geographical location, velocity, altitude, and heading of the UAV 102. For example, in some embodiments, the interfaces 312C may provide access to the Global Positioning System (GPS) or other satellite based location services. In some embodiments, the interfaces 312C may provide access to network based location services (e.g., 3GPP Location Services (LCS)).

A UAV operator 104 may maintain communications with a corresponding UAV 102 via connection 134. The connection 134 may be established through one or more interfaces 312C and may form a wireless command and control (C2) connection that allows the UAV operator 104 to control the UAV 102 through direct commands and/or through issuance of a flight plan. In some embodiments, the connection 134 may additionally allow the UAV operator 104 to receive other forms of data from the UAV 102. For example, the data may include images, video streams, telemetry data, and system status (e.g., battery level/status). In some embodiments, the connection 134 may be a point-to-point connection (e.g., mesh) while in other embodiments the connection 134 between the UAV operator 104 and the UAV 102 may be part of a distributed network (e.g., a cellular network).

In one embodiment, the UAV operator 104 may maintain communication with elements of the UTM system 100 via other corresponding connections. For example, the UAV operator 104 may maintain connection 136 with a UAV Service Supplier (USS) 120. In some embodiments, the connection 136 may be a point-to-point connection while in other embodiments the connection 136 may be part of a distributed network.

In one embodiment, the connection 136 allows the UAV operator 104 to transmit data to or receive data from the USS 120 regarding a current, past, or future flight of the UAV 102. For example, the UAV operator 104 may transmit a proposed flight plan to the USS 120 and receive an actual flight plan and/or enhanced flight plan from the USS 120 via the connection 136. In one embodiment, the UTM system 100 may include a plurality of USSs 120. The set of USSs 120 may alternatively be referred to as a USS network. Each USS 120 offers support for safe airspace operations based on information received from a set of stakeholders and other information sources. The USSs 120 may share information about their supported operations to promote safety and to ensure that each USS 120 has a consistent view of all UAV 102 operations and thus enable the UAVs 102 to stay clear of each other.

The USSs 120 may receive information from a variety of stakeholders and information sources such that the USSs 120 may determine whether a proposed flight plan or an actual flight plan is authorized to proceed. For example, the Federal Aviation Association (FAA) may provide directives and constraints to the USSs 120 via the Flight Information Management System (FIMS) 122. The FIMS 122 provides administration officials a way to issue constraints and directives to the UAV operators 104 and/or the UAVs 102 via a USS 120. Such constraints and directives may be based on information received from the National Airspace System (NAS) Air Traffic Management (ATM) system 124 and/or other NAS data sources 126. In this example, the ATM system 124 could be used to mark certain restricted areas (e.g., airports and military bases) for the UAVs 102 or restrict flights over forest fire areas or other spaces which are normally permitted for the UAVs 102 to operate. In addition to the airspace state and other data provided by the ATM system 124 and other NAS data sources 126, the FIMS 122 may provide impact data, which may describe effects caused by the UAVs 102 to a common airspace.

In some embodiments, the USSs 120 may receive constraints from public safety sources 130. This information may limit UAV 102 flights over areas when such flights may negatively affect public safety. For example, UAV 102 missions may be limited over areas that are currently hosting events with large crowds of people. In some embodiments, the public safety sources 130 may provide data that is presented/transmitted to UAV operators 104 via the USS 120 for the planning of a flight plan/mission. The USSs 120 may also make UAV 102 flight/operations information available to the public 132.

In addition to constraints and directives received from FIMS 122, public safety sources 130, and the public 132, the USSs 120 may receive data from supplemental data service providers 128. These supplemental data service providers 128 may provide various pieces of data that are used by the USSs 120 in planning and authorizing a flight plan, including terrain, weather, surveillance, and performance information. The supplemental data service providers 128 may communicate amongst each other to insure consistency and accuracy of information. In some embodiments, the supplemental data service providers 128 may provide data that is presented/transmitted to UAV operators 104 via the USS 120 for the planning of a flight plan/mission.

As will be described in greater detail below, in one embodiment, a supplemental data service provider 128 may provide one or more predefined points 138 to the USS 120 for generation of an enhanced flight path. For example, the USS 120 may use data/information received from one or more supplemental data service providers 128 to generate an actual flight plan from a proposed flight plan received from a UAV operator 104. The USS 120 may receive approval for the actual flight plan based on inputs from various stakeholders in the corresponding airspace (e.g., FIMS 122). The USS 120 may thereafter request a supplemental data service provider 128 to add or suggest predefined points 138 to add to the approved actual flight plan such that an enhanced flight plan may be created. The predefined points 138 provide alternative points/locations for a UAV 102 to fly to upon the occurrence of one or more associated conditions. In particular, the predefined points 138 may provide directions/instructions for the UAV 102 to autonomously deal with unexpected or unplanned issues that arise during the flight of the UAV 102. For example, these predefined points 138 may include remote charging service station locations for emergency charging, safe landing locations for emergency grounding, and sheltered locations of safe harbor (e.g., rooftops or cell-tower enclosures). In some embodiments, predefined points 138 may be associated with attributes, such as priorities (e.g., which predefined point 138 to select for an emergency landing when conditions of multiple predefined points 138 are met) and conditions of use (e.g., use a predefined point 138 only in case of a specific malfunction). In some embodiments, a predefined point 138 may be associated with higher-level directives (e.g., an action to be taken by the UAV 102). For example, for emergency landings, a higher-level directive may be to use a predefined point 138 with a nearest location from the actual/current position of the UAV 102 as a landing spot. In another example, the higher-level directive may be to specify a prioritization and selection criteria per emergency situation. For instance, in some embodiments, in case of loss of communications with the UAV operator 104, the UAV 102 may always use a predefined point 138 with a nearest location as a landing spot (measured from the last reported position of the UAV 102). In some embodiments, additional actions may be specified in case the main flight path is aborted and a predefined point 138 is selected by the UAV 102. For example, the UAV 102 may signal which landing spot the UAV 102 is approaching (e.g., which predefined point 138 the UAV 102 selected) so the UAV 102 can later be recovered proximate to this landing spot.

In some embodiments, the predefined points 138 may be alternatively referred to as predefined locations, alternative points, alternative locations, conditional points, or conditional locations. Although described as providing/transmitting the predefined points 138 to the USS 120, in other embodiments the USS 120 may transmit an actual flight plan to the supplemental data service provider 128 and the supplemental data service provider 128 may add predefined points 138 to the actual flight plan to generate an enhanced flight plan. The supplemental data service provider 128 may thereafter transmit the enhanced flight plan to the USS 120. This enhanced flight plan may thereafter be forwarded to the UAV operator 104. In response to receiving an enhanced flight plan, the UAV operator 104 may begin controlling the UAV 102 to effectuate the enhanced flight plan or the UAV operator 104 may transmit the enhanced flight plan or some set of instructions describing the objectives of the authorized flight plan, including the predefined points 138, to the UAV 102. For example, the UAV operator 104 may at least transmit the predefined points 138 of an enhanced flight plan to the UAV 102. Based on inputs from the UAV operator 104, the processor 312A together with instructions stored in the memory 312B may control the motor controllers 304 and/or actuators 310 to achieve the objectives of the enhanced flight plan. As described above, the UAV 102 may follow a main flight path of the enhanced flight plan until the detection of a condition of a predefined point 138. In response to detection of the condition of the predefined point, the UAV 102 may deviate from the main flight path and move to a selected location of the predefined point 138.

In some embodiments, it may be necessary to update the predefined points 138 during flight of the UAV 102. In some cases, updating the predefined points 138 may be needed if, for example, multiple UAVs 102 are flying in the area and another UAV 102 is occupying a location of one of the predefined points 138 (e.g., a landing location indicated by a predefined point 138 is occupied by a UAV 102 and not available for another UAV 102). Another example would be if a location of a predefined point 138 is decommissioned or malfunctioning. To this end, the UTM system 100 may update the locations 703 during the flight of a UAV 102. This update may be based on the actual position of the UAV 102 on a flight path (e.g., only update the predefined points 138 ahead of the UAV 102 with respect to the main flight path of the enhanced flight plan).

By providing flexible and extensible enhancements to the permission to use an airspace, the UAVs 102 can leverage information for a safer and a friendlier flight mission with minimum interaction with the UTM system 100, air traffic controllers, and/or a UAV operator 104. This framework may yield to many more successfully completed flight missions in a safer and friendlier environment thereby leading to an efficient use of the airspace.

Turning now to FIG. 4, an example method 400 will be discussed for generating an enhanced flight plan according to one embodiment. The operations in the diagram of FIG. 4 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 4 in a particular order, the operations of the method 400 are not restricted to this order. For example, one or more of the operations of the method 400 may be performed in a different order or in partially or fully overlapping time periods. Accordingly, the description and depiction of the method 400 is for illustrative purposes and is not intended to restrict to a particular implementation.

Figure 5A:
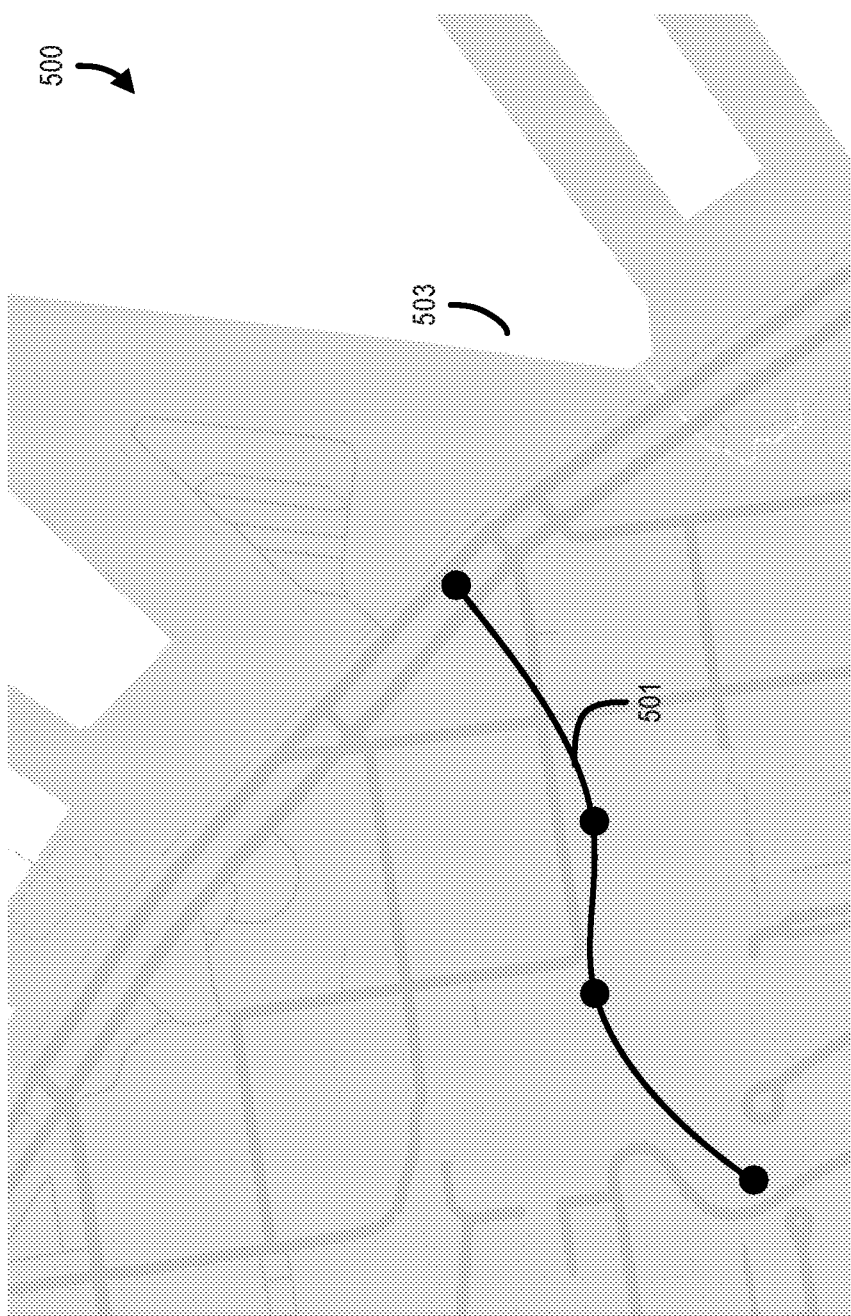
FIG. 5A shows a proposed flight plan, including a flight path, according to one embodiment.
Figure 5B:
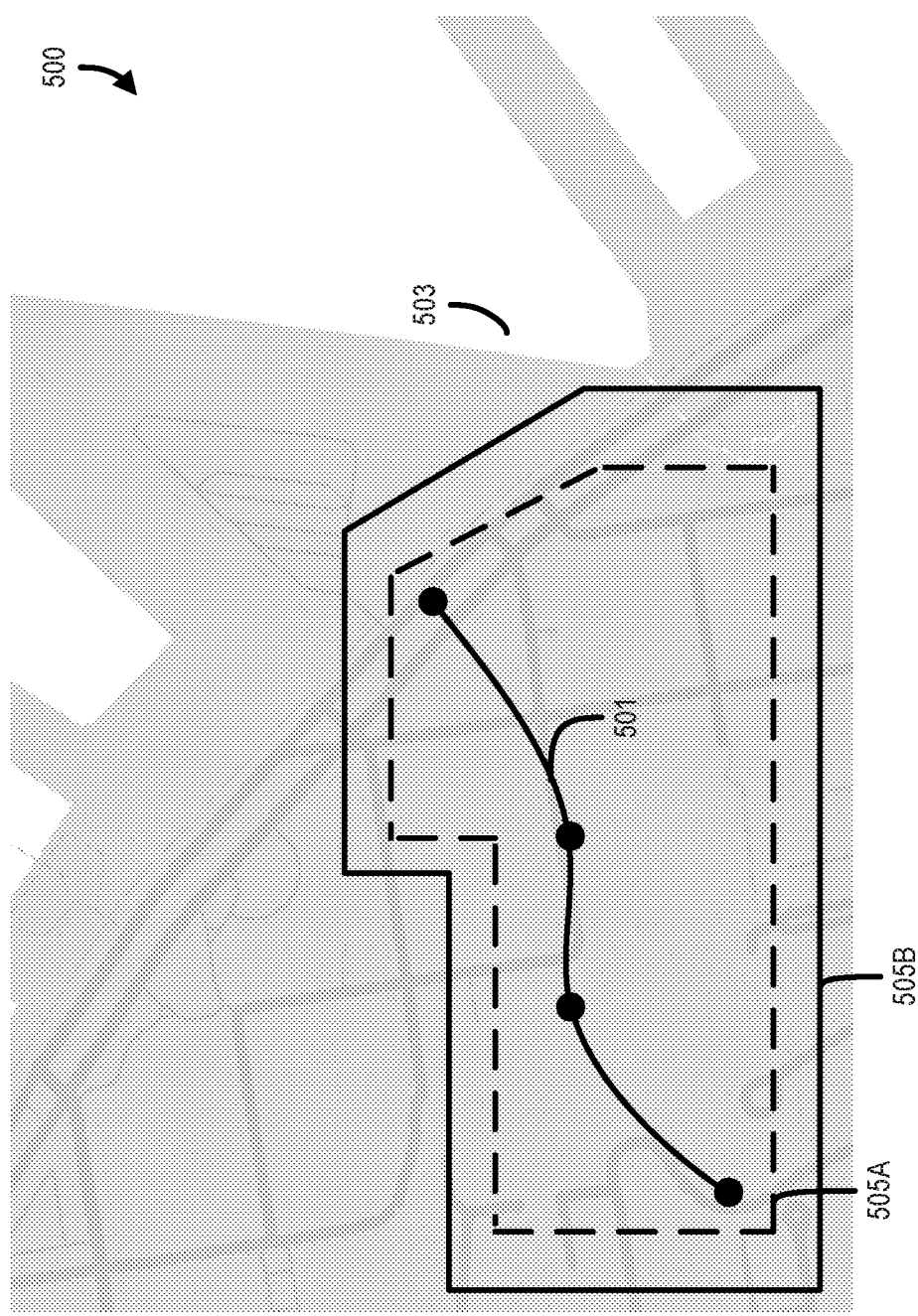
FIG. 5B shows a proposed flight plan, including a flight path and a set of geofences, according to one embodiment.

In one embodiment, the method 400 may commence at operation 402 with a UAV operator 104 creating and transmitting a proposed flight plan to a USS 120 of the UTM system 100. To perform an activity/flight mission (e.g., surveillance of a target or location, monitoring of a target or location, or delivery of an object to a target or location), a UAV operator 104 requests for airspace clearance from the UTM system 100 for a scheduled period of operation. This request for airspace clearance may be expressed in a proposed flight plan. FIG. 5A shows a proposed flight plan 500 according to one example embodiment. As shown, the proposed flight plan 500 includes a flight path 501, including a start point, an ending point (i.e., a target), and one or more intermediate points through an airspace 503. Although shown in relation to a flight path 501, the proposed flight plan 500 may include other elements. For example, as shown in FIG. 5B, the proposed flight plan 500 may include in addition to the flight path 501 or in place of the flight path

501, a geofence 505A describing an authorized area of operation (e.g., an area where the UAV 102 is permitted to fly), and/or a geofence 505B describing an unauthorized area of flight (e.g., an area outside of which the UAV 102 is not permitted to fly). Although not shown in FIGS. 5A and 5B, the proposed flight plan 500 may include one or more of a set of velocities, a set of altitudes, a set of headings/directions, a mission type (e.g., capture video), a set of events (e.g., capture video at prescribed times or locations, hover over an area for a specified interval, etc.), a time/expiration/duration, the type of UAV 102 being used (e.g., flight capabilities of the UAV 102, energy requirements of the UAV 102, and consumption and state of a battery 306 of the UAV 102), and a payload of the UAV 102. The proposed flight plan 500 of FIG. 5A will be used hereinafter for purposes of explanation; however, it is understood that different proposed flight plans may be used with the method 400.

As noted above, the UAV operator 104 may transmit or otherwise make the proposed flight plan 500 available to the UTM system 100. In particular, the proposed flight plan 500 may be transmitted to the USS 120 such that, as described below, the USS 120 may request an actual flight plan from the supplemental data service providers 128 and/or verify that the proposed flight plan 500 and/or the actual flight plan complies with a set of directives and constraints issued by a regulatory authority/agency or another stakeholder (e.g., FIMS 122, public safety sources 130, etc.) in the airspace 503.

Figure 6:
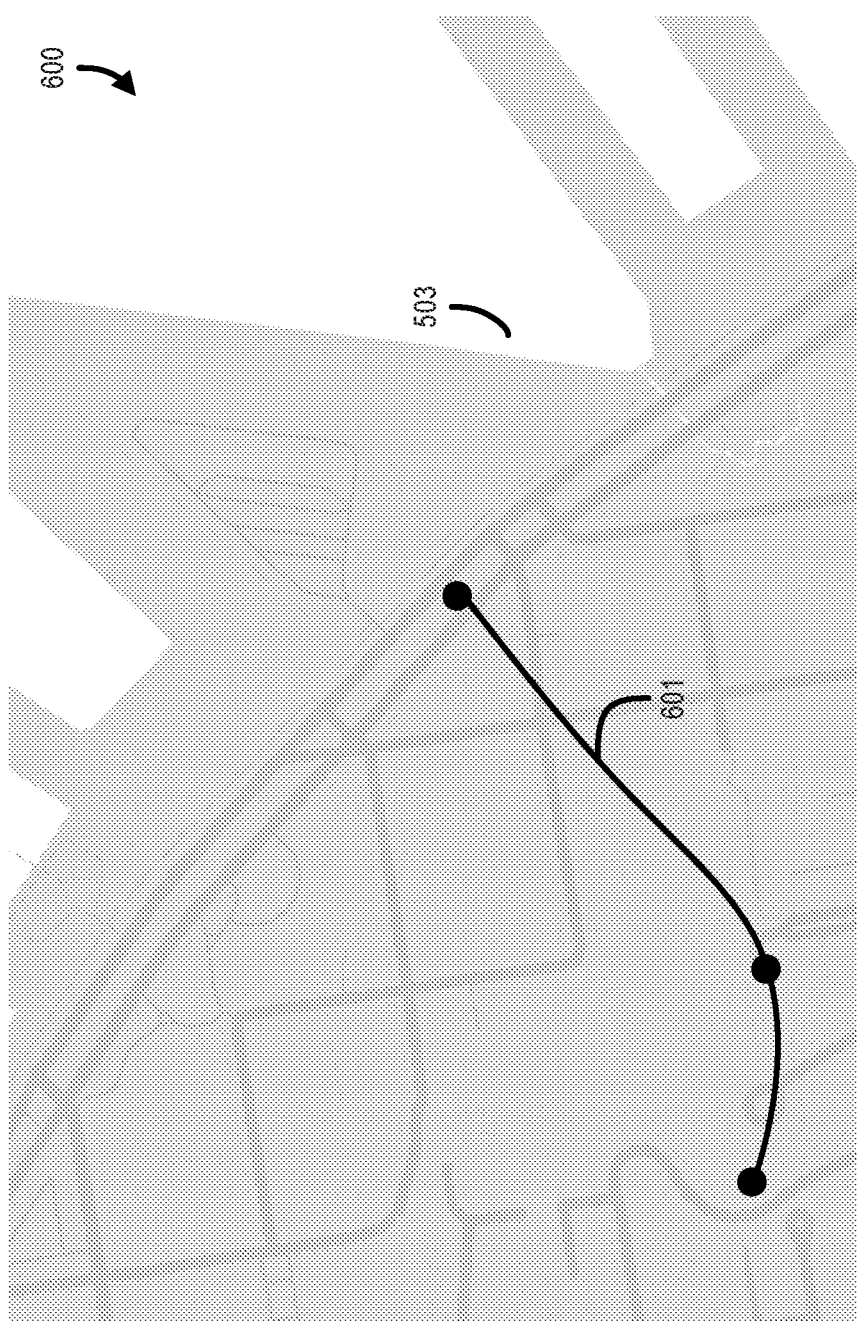
FIG. 6 shows an actual flight plan according to one embodiment.

At operation 404, the USS 120 may issue a request for an actual flight plan to a set of supplemental data service providers 128. In one embodiment, the request may include the proposed flight plan 500. The supplemental data service providers 128 may provide terrain, weather, surveillance, and performance information for adjusting the proposed flight plan 500 to create the actual flight plan, which is transmitted to the USS 120 at operation 406. Although described as transmitting the proposed flight plan 500 to the supplemental data service providers 128 such that the supplemental data service providers 128 may generate the actual flight plan for transmission back to the USS 120, in some embodiments the USS 120 may generate the actual flight plan based on inputs from the supplemental data service providers 128. In some embodiments, the UAV operator 104 may generate the actual flight plan with assistance from the USS 120 based on inputs from the supplemental data service providers 128. FIG. 6 shows an actual flight plan 600 according to one example embodiment. As shown in FIG. 6, the actual flight plan 600 may include a flight path 601 that has been adjusted from the flight path 501 of the proposed flight plan 500. The adjustment may have been caused by terrain, weather, surveillance, and/or performance information. For example, the adjustment to the flight path 501 to create the flight path 601 may have been made to avoid a weather condition.

At operation 408, the actual flight plan 600 may be transmitted to the FIMS 122 for verification. The verification may include determining that the actual flight plan 600 complies with a set of directives and constraints issued by a regulatory authority that manages the airspace 503 covered by the actual flight plan 600 (e.g., the FAA). Although described in relation to U.S. regulatory authorities, the systems and methods described herein may be similarly applied using any regulatory authority/agency overseeing any jurisdiction/territory/airspace.

Upon confirming that the actual flight plan 600 complies with all applicable directives and constraints, the FIMS 122 may provide an approval to the USS 120 at operation 410. Although described as the USS 120 transmitting the actual flight plan 600 to the FIMS 122 for verification/approval of compliance, in some embodiments the USS 120 may verify that the actual flight plan 600 complies with all applicable directives and constraints based on inputs from the FIMS 122. In one embodiment, the actual flight plan 600 may be modified to comply with the directives and constraints.

At operation 412, the USS 120 may request an enhanced flight plan from a supplemental data service provider 128, and the supplemental data service provider 128 may return the enhanced flight plan to the USS 120 at operation 414. In one embodiment, the enhanced flight plan may include the details of the actual flight plan 600 in addition to a set of predefined points 138. For purposes of explanation, the enhanced flight plan described hereinafter will include details of the actual flight plan 600 in addition to a set of predefined points 138.

Figure 7:
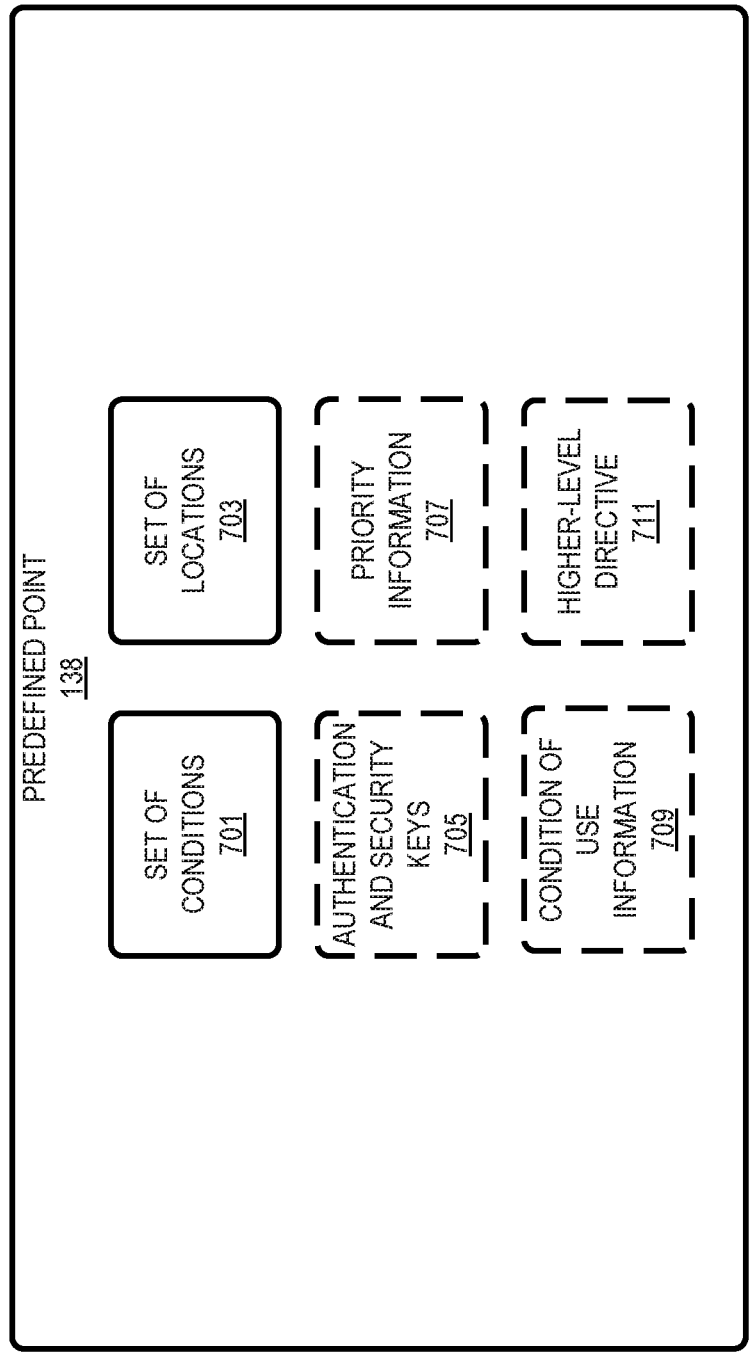
FIG. 7 shows a predefined location according to one embodiment.
Figure 8:
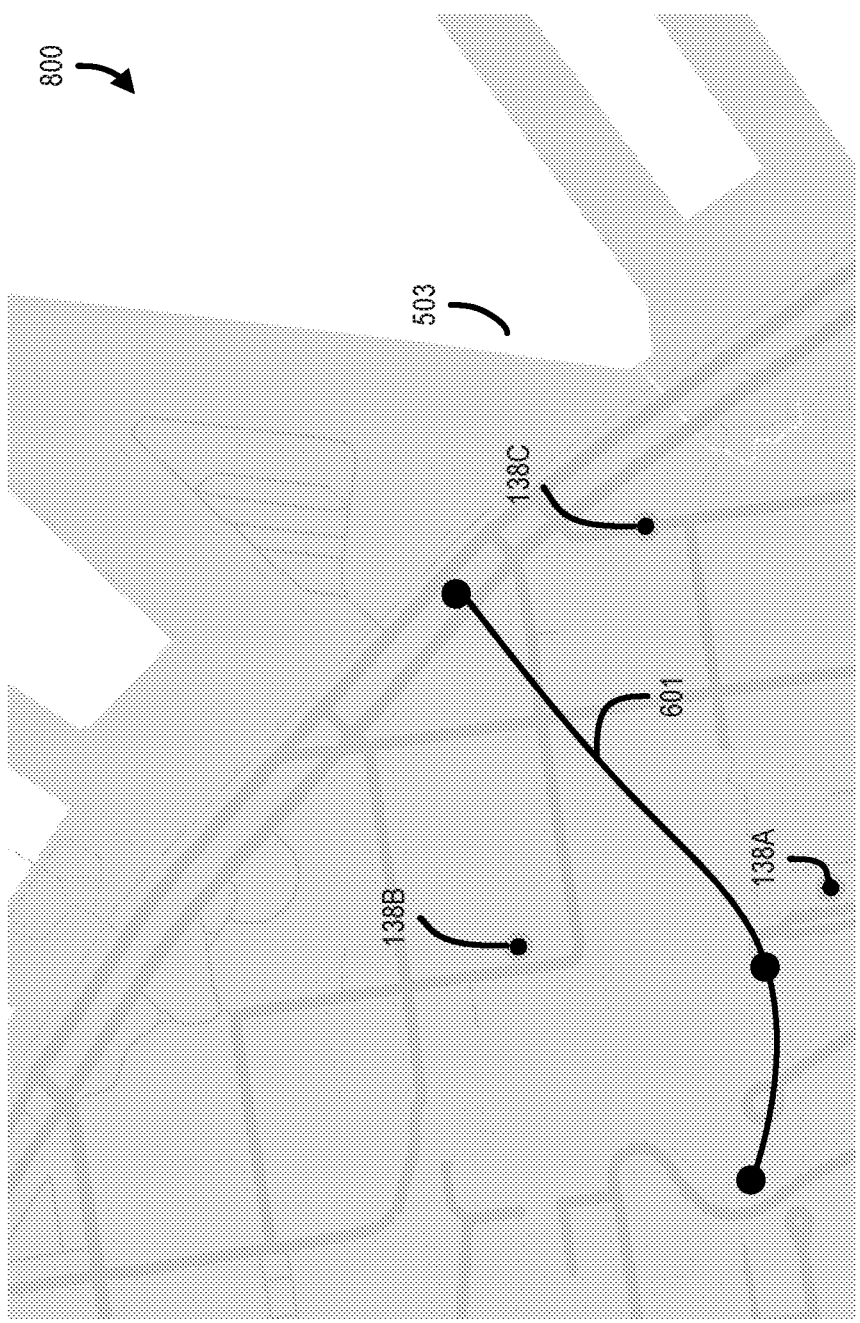
FIG. 8 shows an enhanced flight plan according to one embodiment.

The predefined points 138 may describe some combination of remote charging service station locations for emergency charging, safe landing locations for emergency grounding, and sheltered locations of safe harbor (e.g., rooftops or cell-tower enclosures), or other points outside the flight path 601. In one embodiment, each of the predefined points 138 may comply with all directives, constraints, and other rules and regulations issued by a regulatory authority or other stakeholders of the common airspace 503. As shown in FIG. 7, in one embodiment, a predefined point 138 may be defined by a set of conditions 701 and a set of locations 703. Upon detection of the set of conditions 701 for a predefined point 138, the UAV 102 acts autonomously to move to the set of locations 703 associated with the predefined point 138 for which the condition 701 was detected. For example, FIG. 8 shows an enhanced flight plan 800 that includes a flight path 601 from the actual flight plan 600 (sometimes referred to as a main flight path 601 or an original flight path 601) and predefined points 138A-138C. In this example, the predefined point 138A may include a low battery condition 701 corresponding to the battery 306 of the UAV 102 being below a predefined level (e.g., the battery 306 of the UAV 102 is below 20%) and an associated location 703 may be the location of a charging station. In this example embodiment, upon detecting that the battery 306 of the UAV 102 is below the predefined level, which matches the low battery condition 701, the UAV 102 may deviate from the original/main flight path 601 and head to the associated location 703 of the predefined point 138A (i.e., the location of the charging station). In the preceding example, the original/main flight path 601 may be a flight path provided by the actual flight plan 600, which is also included in the enhanced flight plan 800, while the predefined points 138 of the enhanced flight plan 800 define alternative paths or deviations for the UAV 102 to take when associated conditions 701 are detected.

In one embodiment, the predefined points 138 may be stored/downloaded to a UAV 102 for use upon occurrence of a condition 701 as will be described below. In some embodiments, locations 703 of predefined points 138 may be defined/represented by a set of geographical coordinates (e.g., longitude, latitude, and/or altitude). In one embodiment, the locations 703 may be an area in the airspace 503. For example, a location 703 of a predefined point 138 may be defined/represented by a set of coordinates (e.g., longitude, latitude, and/or altitude) and a distance. In this example embodiment, the area of the location 703 is a sphere centered at the coordinates with a radius of the provided distance measure. In other embodiments, the area of a location 703 may be other two or three-dimensional shapes that are defined/represented by multiple sets of coordinates and/or distance measures. For example, a set of four coordinate groups may represent a rectangular open field that may be used by the UAV 102 for landing.

In some embodiments, a predefined point 138 may include authentication and security keys 705 for establishing communications with or access to a service system at a location 703. For example, a location 703 of a predefined point 138 may provide a beacon for guiding the UAV 102 to a landing or charging station. In this example, the predefined point 138 that is part of an enhanced flight plan 800 may include authentication and security keys 705 for gaining access to the beacon. In another example, the predefined point 138 may include authentication and security keys 705 for accessing a charging station at a location 703 specified in the predefined point 138.

In some embodiments, a predefined point 138 may be associated with priority information 707 (e.g., which emergency landing location 703 to select when a predefined point 138 includes multiple locations 703) and condition of use information 709 (e.g., a condition 701 indicates the occurrence of a malfunction and the condition of use information 709 indicates that a location 703 may only be used in case of a specific malfunction).

In some embodiments, each type of predefined point 138 can be associated with a higher-level directive 711 (e.g., an action to be taken by the UAV 102). For example, for emergency landings, a higher-level directive 711 may be to use the nearest location 703 of a set of locations 703, from the actual/current position of the UAV 102, as a landing spot. In another example, the higher-level directive 711 may be to specify a prioritization and selection criteria per emergency situation. For instance, in case of the loss of communications with a UAV operator 104, a higher-level directive 711 may be to always use the nearest location 703 of a set of locations 703, from the last reported position of the UAV 102, as a landing spot for the UAV 102.

In some embodiments, a higher-level directive 711 may include additional actions to be taken by the UAV 102. For example, an additional action 713 may include the UAV 102 signaling to the UTM system 100 or otherwise broadcasting which landing spot the UAV 102 is approaching so the UAV 102 can later be recovered.

In some embodiments, it may be necessary to update the predefined points 138 during the flight mission. In some cases, this would be needed if, for example, multiple UAVs 102 are flying in the area and another UAV 102 is occupying one of the locations 703 of a predefined point 138 (e.g., a landing zone). Another example would be if a location 703 of a predefined point 138 is decommissioned or malfunctioning.

In one embodiment, the predefined points 138 may be provided by a supplemental data service provider 128. In one embodiment, the supplemental data service provider 128 used at operations 412 and 414 to add predefined points 138 to the actual flight plan 600 may be different/distinct from the supplemental data service provider 128 used at operations 404 and 406.

Although described as the supplemental data service provider 128 generating and transmitting the enhanced flight plan 800 to the USS 120, in some embodiments, the supplemental data service provider 128 may provide a set of predefined points 138 to the USS 120, and the USS 120 (with or without assistance from the UAV operator 104) may generate the enhanced flight plan 800 using the set of predefined points 138. Accordingly, the USS 120 and/or the UAV operator 104 may be tasked with selecting and incorporating predefined points 138 into the enhanced flight plan 800.

At operation 416, the enhanced flight plan 800 may be transmitted to the UAV operator 104. The UAV operator 104 may thereafter start to carry out the enhanced flight plan 800 at operation 418. In this embodiment, part or all of the enhanced flight plan 800 may be transmitted and stored on the UAV 102. For example, the predefined points 138 of the enhanced flight plan 800 may be stored on the UAV 102 (e.g., in memory 312B). In some embodiments, the predefined points 138 may be stored on the UAV 102 in prioritized order and consulted by the UAV 102 when an emergency or malfunction arises as a contingency for safe action (e.g., landing pad or charging station, which is either closest or is preferred).

At operation 420, a condition 701 may be detected that causes the UAV 102 to autonomously adjust navigation settings and target a location 703 indicated by one of the predefined points 138. For example, a predefined point 138 may include a motor 302 malfunction condition 701 and an emergency landing site location 703. Upon detecting a failed motor 302, the UAV 102 may determine that the motor 302 malfunction condition 701 has been met and in response may autonomously begin movement to the emergency landing location 703 associated with the motor 302 malfunction condition 701. In another example, a predefined point 138 may include a remote abort condition 701 and a plurality of landing site locations 703. Upon receiving a request to abort the current mission (e.g., the enhanced flight plan 800), the UAV 102 may prioritize the plurality of landing site locations 703 based on distance from the current location of the UAV 102 and select an emergency landing location 703.

In some embodiments, a predefined point 138 may be used in cases where redundant command and control (C2) links and a high/wide-bandwidth link (e.g., cellular/LTE connection) have failed, but a low/narrow-bandwidth link remains. Upon detecting the high-bandwidth link failing, the UTM system 100 may issue an abort command and immediately transmit a land trigger to the UAV 102. Upon detection of this triggering condition 701, the UAV 102 may retrieve a set of stored safe landing locations 703. In some embodiments, the UAV 102 may inform the USS 120 of a safe landing and the location 703 of the landing via the low/narrow-bandwidth link.

In some embodiments, a predefined point 138 may be used to navigate to regain a C2 link. For example, upon detecting a triggering condition 701 of a loss of a C2 link, the UAV 102 may identify a set of network tower locations 703 associated with the condition 701. The UAV 102 may thereafter autonomously navigate to a closest or preferred network tower at a location 703 specified by a predefined point 138 in an attempt to regain the C2 link. The predefined point 138 and associated condition 701 described above may be further extended to include a further failure to establish the C2 link condition 701. Upon detecting a further failure condition 701 (e.g., after passage of a defined period of time), the UAV 102 may navigate to an emergency landing location 703 associated with the predefined point 138.

Although described above as predefined points 138 including physical locations 703 of network/communication towers, in some embodiments, the predefined points 138 may include locations 703 (e.g., a point defined by a set of coordinates or an area defined by coordinates and/or distance measures) of high network availability (e.g., a signal strength or signal-to-noise ratio above a defined level or above a current level). These known locations 703 of high quality network signal may be proximate to a network tower or they may be at some distance from the tower.

In some embodiments, network infrastructure (e.g., network/communication towers) may provide beacons to guide a UAV 102 to a safe location 703. The landing location 703 may provide various services, including battery charging, reestablishment of a C2 link, and shelter from a meteorological/weather condition 701 until the condition 701 has passed.

In some embodiments, a predefined point 138 may be associated with different weather conditions 701. For example, different predefined points 138 may be associated with different weather conditions 701 and/or different locations 703 where weather conditions 701 often change (e.g., micro weather conditions 701). In this embodiment, when a landing or another action needs to take place, the weather conditions 701 associated with the predefined point 138 may be taken into account before making a decision (e.g., selecting a landing location 703).

Figure 9:
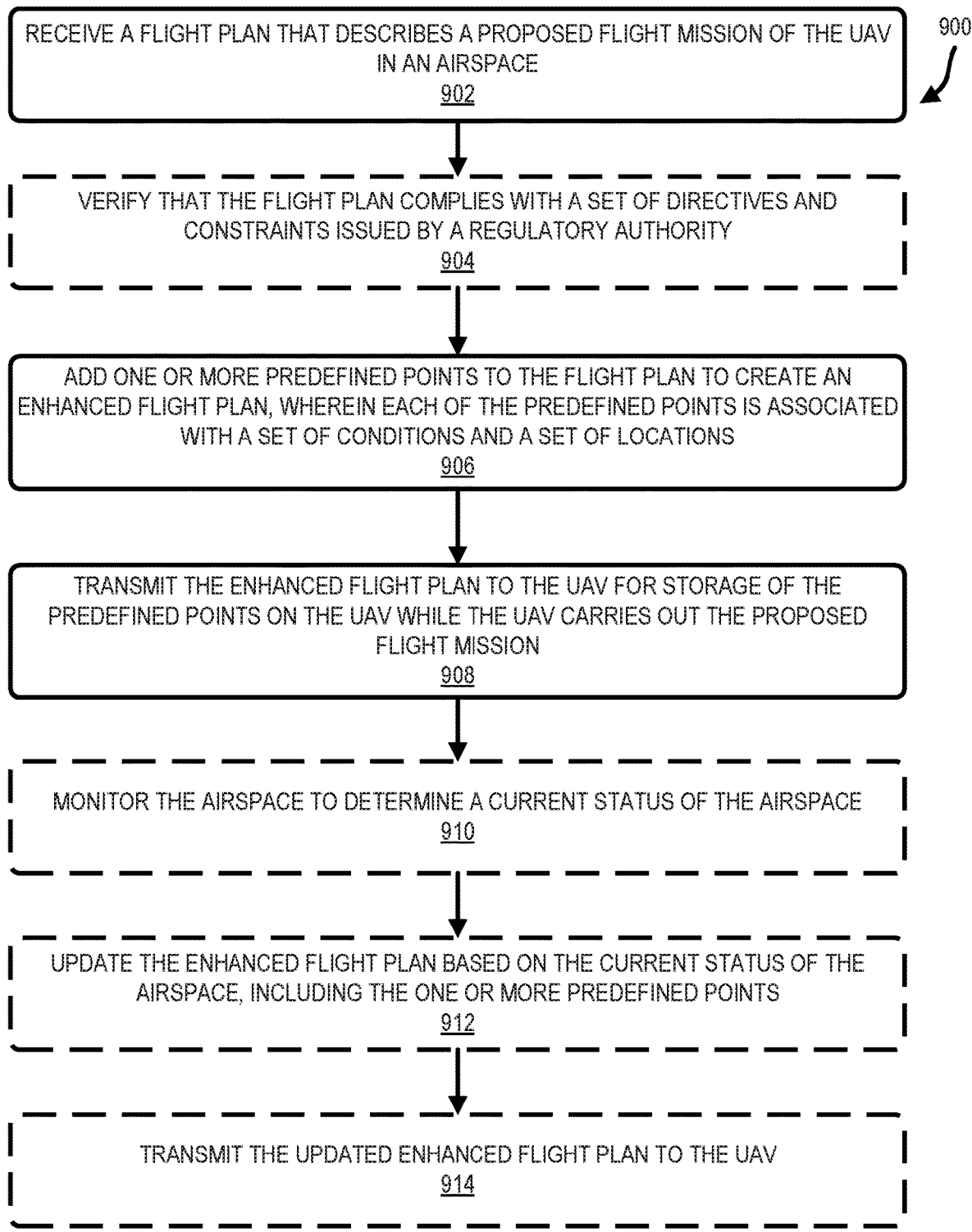
FIG. 9 illustrates a method for managing a flight of a UAV according to one embodiment.

Turning now to FIG. 9, a method 900 will be described for managing a flight of a UAV 102 according to one example embodiment. The operations in the diagram of FIG. 9 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 9 in a particular order, the operations of the method 900 are not restricted to this order. For example, one or more of the operations of the method 900 may be performed in a different order or in partially or fully overlapping time periods. Accordingly, the description and depiction of the method 900 is for illustrative purposes and is not intended to restrict to a particular implementation.

In one embodiment, the method 900 may commence at operation 902 with the UTM system 100 receiving a flight plan that describes a proposed flight mission of the UAV 102 in an airspace. For example, in one example embodiment, the flight plan received at operation 902 may be the proposed flight plan 500 of FIG. 5A or FIG. 5B. Alternatively, the flight plan received at operation 902 may be the actual flight plan 600 of FIG. 6.

At operation 904, the UTM system 100 may verify that the flight plan received at operation 902 complies with a set of directives and constraints issued by a regulatory authority. For example, the USS 120 of the UTM system 100 may work with various organization/stakeholders (e.g., FIMS 122) at operation 904 to verify that the flight plan received at operation 902 complies with a set of directives and constraints. In one embodiment, the flight plan received at operation 902 may be modified at operation 904 to comply with the set of directives and constraints.

At operation 906, the UTM system 100 (e.g., the USS 120 or a supplemental data service provider 128) may add one or more predefined points 138 to the flight plan to create an enhanced flight plan 800, wherein each of the predefined points 138 is associated with a set of conditions 701 and a set of locations 703. In one embodiment, each predefined point 138 in the one or more predefined points 138 complies with the set of directives and constraints used at operation 904. In one embodiment, a predefined point 138 in the one or more predefined points 138 is associated with a higher-level directive 711 describing an action to be taken by the UAV 102 upon detecting an occurrence of a condition 701 in the set of conditions 701 associated with the predefined point 138. In some embodiments, a higher-level directive 711 of a predefined point 138 includes prioritization and selection criteria for selecting a location 703 from the set of locations 703 associated with the predefined point 138. In some embodiments, a higher-level directive 711 of a predefined point 138 includes transmitting an indication of a selected location 703 from the set of locations 703 associated with the predefined point 138 to a device/entity separate from the UAV 102 (e.g., the UTM system 100 and/or another UAV 102).

In one embodiment, the set of locations 703 associated with a predefined point 138 in the one or more predefined points 138 is a plurality of locations 703 that are each associated with a single condition 701. In this embodiment, each location 703 in the plurality of locations 703 may be associated with priority information 707 such that the UAV 102 considers adjusting a flight of the UAV 102 using one location 703 in the plurality of locations 703 based on the priority information 707 associated with each location 703 in the plurality of locations 703 upon detecting the occurrence of the single condition 701.

In some embodiments, a predefined point 138 in the one or more predefined points 138 is associated with a loss of a UAV operator 104 connection 134 condition 701 and a set of locations 703 corresponding to locations of high network availability such that, upon detecting a loss of a connection 134 with a UAV operator 104, the UAV 102 is to autonomously decide to navigate to a location 703 in the set of locations 703 corresponding to locations of high network availability to regain the connection 134 with the UAV operator 104. In some embodiments, the locations 703 of high network availability are locations of communication towers (e.g., cell towers). In one of the above embodiments, the predefined point 138 in the one or more predefined points 138 is further associated with a failure to regain a UAV operator 104 connection 134 condition 701 and a set of locations 703 corresponding to safe landing zones such that, after detecting the loss of a UAV operator 104 connection 134 condition 701, navigating to a high network availability location 703, failing to regain the connection 134 with the UAV operator 104, and upon detecting a failure to regain connection 134 with the UAV operator 104, the UAV 102 is to autonomously decide to land at a location 703 in the set of locations 703 corresponding to the safe landing zones.

In some embodiments, a predefined point 138 in the one or more predefined points 138 is associated with a low battery 306 condition 701 and a set of locations 703 corresponding to safe landing zones for charging the UAV 102. Upon detecting a battery 306 level of the UAV 102 below a defined level, the UAV 102 is to autonomously decide to land at a location 703 in the set of locations 703 corresponding to the safe landing zones.

In some embodiments, a predefined point 138 in the one or more predefined points 138 is associated with a severe weather condition 701 and a set of locations 703 corresponding to safe landing zones. Upon detecting a severe weather condition 701, the UAV 102 is to autonomously decide to land at a location 703 in the set of locations 703 corresponding to the safe landing zones.

At operation 908, the UTM system 100 may transmit the enhanced flight plan 800 to the UAV 102 for storage of the predefined points 138 on the UAV 102 while the UAV 102 carries out the proposed flight mission. In one embodiment, the enhanced flight plan 800 may be first transmitted or otherwise made available to the UAV operator 104 such that the UAV operator 104 may transmit the enhanced flight plan 800 to the UAV 102.

At operation 910, the UTM system 100 may monitor the airspace to determine a current status of the airspace 503. This monitoring of the airspace 503 may include monitoring the status of other UAVs 102, other aircraft (e.g., planes, helicopters, or other airborne entities), weather conditions, locations 703 included in predefined points 138, etc.

At operation 912, the UTM system 100 may update the enhanced flight plan 800 based on the current status of the airspace 503, including the one or more predefined points 138. For example, in response to determining that a location 703 included in a predefined point 138 is occupied, the predefined point 138 of the enhanced flight plan 800 may be updated to remove or update the occupied location.

At operation 914, the UTM system 100 may transmit the updated enhanced flight plan 800 to the UAV 102. In some embodiments, instead of updating the enhanced flight plan 800 and transmitting the updated enhanced flight plan 800, the UTM system 100 may transmit to the UAV 102 information indicating only what has changed (i.e., based on the current status of the airspace monitored at operation 910) for the enhanced flight plan 800. For example, an existing predefined point 138 of the enhanced flight plan 800 transmitted at operation 908 may no longer be viable (e.g., due to malfunction), and a new predefined point 138 may be added (e.g., a previously occupied charging station is now available). In this case, the UTM system 100 may transmit a replacement list of predefined points 138, or may instead transmit information about the new predefined point 138 and an indication that the existing predefined point 138 is no longer operational.

Figure 10:
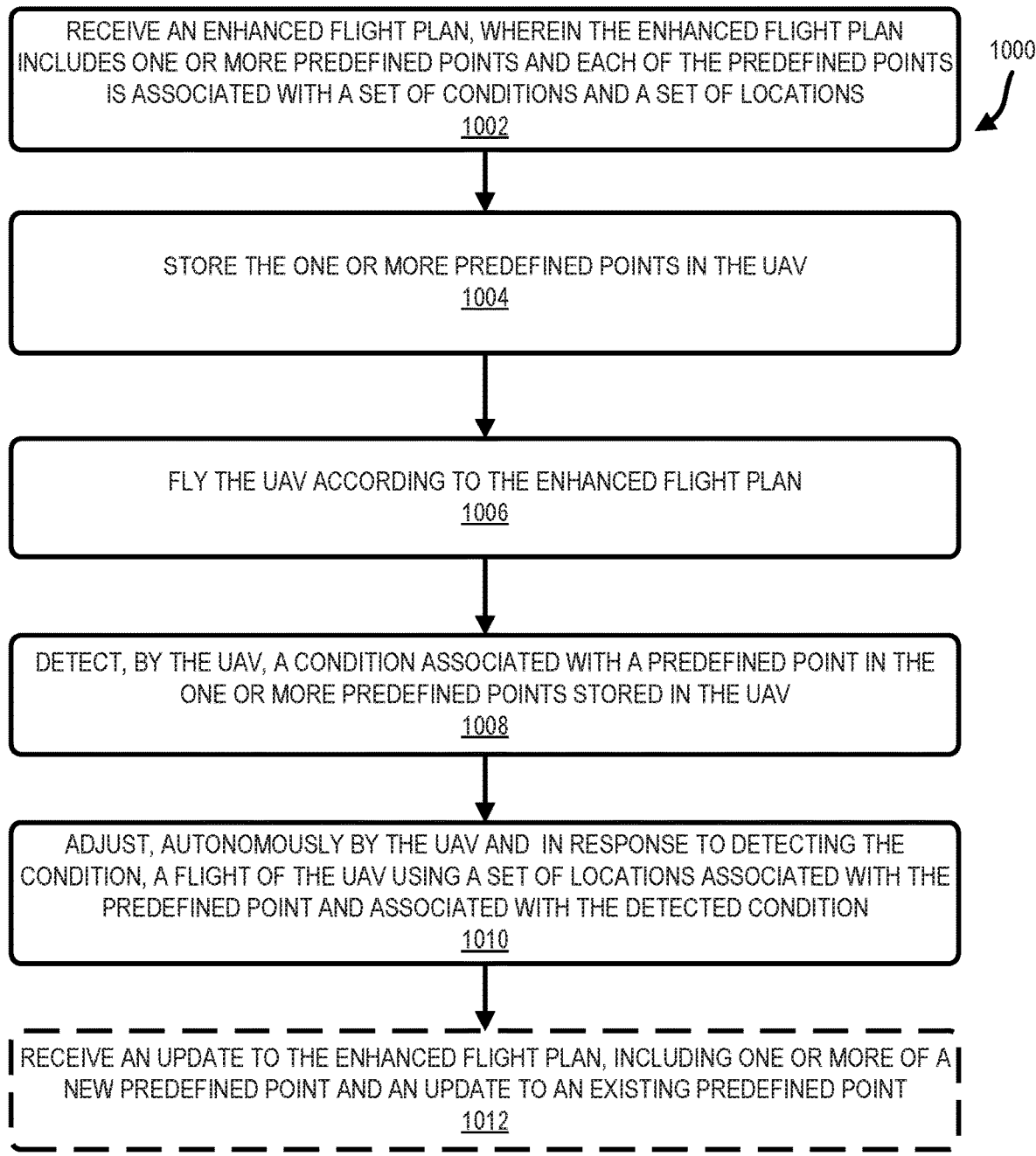
FIG. 10 illustrates a method for controlling a flight of a UAV according to one embodiment.

Turning now to FIG. 10, a method 1000 will be described for controlling a UAV 102 according to one example embodiment. The operations in the diagram of FIG. 10 will be described with reference to the exemplary implementations of the other figures. However, it should be understood that the operations of the diagram can be performed by implementations other than those discussed with reference to the other figures, and the implementations discussed with reference to these other figures can perform operations different than those discussed with reference to the diagram. Although described and shown in FIG. 10 in a particular order, the operations of the method 1000 are not restricted to this order. For example, one or more of the operations of the method 1000 may be performed in a different order or in partially or fully overlapping time periods. Accordingly, the description and depiction of the method 1000 is for illustrative purposes and is not intended to restrict to a particular implementation.

In one embodiment, the method 1000 may commence at operation 1002 with the UAV 102 receiving an enhanced flight plan, wherein the enhanced flight plan includes one or more predefined points 138 and each of the predefined points 138 is associated with a set of conditions 701 and a set of locations 703. For example, as will be used in the description below, in one embodiment, the UAV 102 may receive the enhanced flight plan 800 at operation 1002.

At operation 1004, the UAV 102 may store the one or more predefined points 138 of the enhanced flight plan 800. For example, in some embodiments, the UAV 102 may store the entire enhanced flight plan 800, including the predefined points 138, while in other embodiments, the UAV 102 may just store the predefined points 138 at operation 1004. The predefined points 138 indicate deviations, relative to a main flight path 601, for the UAV 102 to follow upon occurrence of an unexpected event that matches a condition 701 of a predefined point 138.

At operation 1006, the UAV 102 may be flown according to the enhanced flight plan 800. For example, in one embodiment, the UAV 102 may be flown according to the main flight path 601 at operation 1006 (either autonomously or based on inputs form the UAV operator 104). Accordingly, the UAV 102 is flown according to a known and pre-planned route/path at operation 1006.

At operation 1008, the UAV 102 may detect a condition 701 associated with a predefined point 138 in the one or more predefined points 138 stored in the UAV 102.

At operation 1010, the UAV 102 may adjust, autonomously and in response to detecting the condition 701, a flight of the UAV 102 using a set of locations 703 associated with the predefined point 138 and associated with the detected condition 701. In one embodiment, the predefined point 138 in the one or more predefined points 138 is associated with a plurality of locations 703 that are each associated with a single condition 701, and each location 703 in the plurality of locations 703 is associated with a priority (i.e., priority information 707). In this embodiment, adjusting the flight of the UAV 102 may include adjusting the flight of the UAV 102 using one location in the plurality of locations based on the priority associated with each location in the plurality of locations upon detecting the occurrence of the single condition.

In one embodiment, the predefined point 138 in the one or more predefined points 138 is associated with a higher-level directive 711 describing an action to be taken by the UAV 102 upon detecting an occurrence of the condition 701 associated with the predefined point 138. In one embodiment, the higher-level directive 711 of the predefined point 138 may include prioritization and selection criteria for selecting a location 703 from the set of locations 703 associated with the predefined point 138. In one embodiment, the higher-level directive 711 of the predefined point 138 includes transmitting an indication of a selected location 703 from the set of locations 703 associated with the predefined point 138 to a device/entity separate from the UAV 102 (e.g., the UTM system 100).

At operation 712, the UAV 102 may receive an update to the enhanced flight plan 800, including one or more of a new predefined point 138 and an update to an existing predefined point 138. In some embodiments, instead of the UAV 102 receiving an updated enhanced flight plan 800, the UAV 102 may receive information indicating only what has changed for the enhanced flight plan 800. For example, the UAV 102 may receive a replacement list of predefined points 138 or may instead receive information about the one or more new predefined points 138 and an indication that the existing predefined point 138 changed (e.g., is no longer operational). The UAV 102 may update the stored predefined points 138 with the received updated enhanced flight plan 800, a received replacement list of predefined points 138, or any other information/indication of changed/new predefined points 138.

By providing flexible and extensible enhancements to the permission to use an airspace, the UAVs 102 can leverage information for a safer and a friendlier flight mission with minimum interaction with the UTM system 100, air traffic controllers, and/or a UAV operator 104. This framework may yield to many more successfully completed flight missions in a safer and friendlier environment thereby leading to an efficient use of the airspace.

Each element of the UTM system 100 may be composed of or otherwise implemented by a set of computing/networking devices. For example, FIG. 11, illustrates a computing/networking device 1100 according to one embodiment. As shown the computing/networking device 1100 may include a processor 1102 communicatively coupled to a memory 1104 and an interface 1106. The processor 1102 may be a microprocessor, controller, microcontroller, central processing unit, digital signal processor, application specific integrated circuit, field programmable gate array, any other type of electronic circuitry, or any combination of one or more of the preceding. The processor 1102 may comprise one or more processor cores. In particular embodiments, some or all of the functionality described herein as being provided by a component of the UTM system 100 may be implemented by one or more processors 1102 of one or more computing/networking devices 1100 executing software instructions, either alone or in conjunction with other computing/networking devices 1100 components, such as the memory 1104.

The memory 1104 may store code (which is composed of software instructions and which is sometimes referred to as computer program code or a computer program) and/or data using non-transitory machine-readable (e.g., computer-readable) media, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1104 may comprise non-volatile memory (e.g., a non-transitory computer-readable storage medium 1110) containing code to be executed by the processor 1102. Where the memory 1104 is non-volatile, the code and/or data stored therein can persist even when the computing/networking device 1100 is turned off (when power is removed). In some instances, while the computing/networking device 1100 is turned on, that part of the code that is to be executed by the processor(s) 1102 may be copied from non-volatile memory into volatile memory (e.g., dynamic random-access memory (DRAM), static random-access memory (SRAM)) of the computing/networking device 1100.

The interface 1106 may be used in the wired and/or wireless communication of signaling and/or data to or from computing/networking device 1100. For example, interface 1106 may perform any formatting, coding, or translating to allow computing/networking device 1100 to send and receive data whether over a wired and/or a wireless connection. In some embodiments, the interface 1106 may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via the antennas 1108 to the appropriate recipient(s). In some embodiments, interface 1106 may comprise network interface controller(s) (NICs), also known as a network interface card, network adapter, local area network (LAN) adapter or physical network interface. The NIC(s) may facilitate in connecting the computing/networking device 1100 to other devices allowing them to communicate via wire through plugging in a cable to a physical port connected to a NIC. In particular embodiments, the processor 1102 may represent part of the interface 1106, and some or all of the functionality described as being provided by the interface 1106 may be provided in part or in whole by the processor 1102.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing an Unmanned Aerial Vehicle (UAV), comprising:
   receiving a flight plan that describes a proposed flight mission of the UAV in an airspace;
   adding one or more predefined points to the flight plan to create an enhanced flight plan, wherein each predefined point of the one or more predefined points is associated with a set of conditions and a set of locations and wherein a predefined point in the one or more predefined points is associated with a higher-level directive describing an action to be taken by the UAV upon detecting an occurrence of a condition in the set of conditions associated with the predefined point and to deviate from the flight plan, based on the higher-level directive, to a location from the set of locations; and
   transmitting the enhanced flight plan to the UAV for storage of the predefined points on the UAV while the UAV carries out the proposed flight mission.

2. The method of claim 1, further comprising:
   verifying that the flight plan complies with a set of directives and constraints issued by a regulatory authority.

3. The method of claim 2, wherein each predefined point in the one or more predefined points complies with the set of directives and constraints.

4. The method of claim 1, wherein the higher-level directive of the predefined point includes prioritization and selection criteria for selecting the location from the set of locations associated with the predefined point.

5. The method of claim 4, wherein the higher-level directive of the predefined point includes transmitting an indication of the selected location from the set of locations associated with the predefined point to a device separate from the UAV.

6. The method of claim 1, further comprising:
   monitoring the airspace to determine a current status of the airspace;
   updating the enhanced flight plan based on the current status of the airspace, including the one or more predefined points; and
   transmitting the updated enhanced flight plan to the UAV.

7. The method of claim 6, wherein the airspace includes one or more of an area in which the UAV is scheduled to fly or proximate to where the UAV is scheduled to fly, locations of airborne entities in the area, including the UAV, and landing locations in the area.

8. The method of claim 1, wherein the set of locations is a plurality of locations that are each associated with a single condition, and each location in the plurality of locations is associated with a priority such that the UAV considers adjusting a flight of the UAV using one location in the plurality of locations based on the priority associated with each location in the plurality of locations upon detecting an occurrence of the single condition.

9. The method of claim 1, wherein the predefined point is associated with a loss of a UAV operator connection condition and a set of locations corresponding to locations of high network availability such that, upon detecting a loss of a connection with a UAV operator, the UAV is to autonomously decide to navigate to the location corresponding to high network availability to regain the connection with the UAV operator.

10. The method of claim 9, wherein the location of high network availability correspond to a communication tower.

11. The method of claim 9, wherein the predefined point is further associated with a failure to regain a UAV operator connection condition and the set of locations corresponding to safe landing zones such that, after detecting the loss of a UAV operator connection condition, navigating to a high network availability location, failing to regain the connection with the UAV operator, and upon detecting a failure to regain connection with the UAV operator, the UAV is to autonomously decide to land at the location in the set of locations corresponding to the safe landing zones.

12. The method of claim 1, wherein the predefined point is associated with a low battery condition and the set of locations corresponding to safe landing zones for charging the UAV such that, upon detecting a battery level of the UAV below a defined level, the UAV is to autonomously decide to land at the location in the set of locations corresponding to the safe landing zones.

13. The method of claim 1, wherein the predefined point is associated with a severe weather condition and the set of locations corresponding to safe landing zones such that upon detecting a severe weather condition, the UAV is to autonomously decide to land at the location in the set of locations corresponding to the safe landing zones.

14. The method of claim 1, wherein the predefined point is associated with an aborted flight condition and the set of locations corresponding to safe landing zones.

15. The method of claim 14, further comprising:
transmitting a request to immediately abort the proposed flight mission to the UAV, which causes the UAV to detect the aborted flight condition and to land at the location in the set of locations corresponding to the safe landing zones associated with the aborted flight condition.

16. The method of claim 1, wherein the one or more predefined points are provided by a Supplemental Data Service Provider within a UAV Traffic Management (UTM) system.

17. The method of claim 16, wherein a UAV Service Supplier (USS) within the UTM system adds the one or more predefined points provided by the Supplemental Data Service Provider to create the enhanced flight plan.

18. The method of claim 16, wherein the Supplemental Data Service Provider adds the one or more predefined points to the flight plan to create the enhanced flight plan.

19. The method of claim 1, wherein the one or more predefined points include authentication and secure keys to establish communication with and authorize use of a service system located at the location in the set of locations.

20. The method of claim 19, wherein the service system is a beacon for guiding the UAV.

21. The method of claim 19, wherein the service system is a charging station for the UAV.

22. A non-transitory computer-readable storage medium storing instructions which, when executed by a set of one or more processors of a computing device, cause a network device to manage an Unmanned Aerial Vehicle (UAV), comprising:
receive a flight plan that describes a proposed flight mission of the UAV in an airspace;
add one or more predefined points to the flight plan to create an enhanced flight plan, wherein each predefined point of the one or more predefined points is associated with a set of conditions and a set of locations and wherein a predefined point in the one or more predefined points is associated with a higher-level directive describing an action to be taken by the UAV upon detecting an occurrence of a condition in the set of conditions associated with the predefined point and to deviate from the flight plan, based on the higher-level directive, to a location from the set of locations; and
transmit the enhanced flight plan to the UAV for storage of the predefined points on the UAV while the UAV carries out the proposed flight mission.

23. A network device for managing an Unmanned Aerial Vehicle (UAV), comprising:
a processor;
a memory coupled to the processor, wherein the memory includes one or more instructions that when executed by the processor cause the network device to:
receive a flight plan that describes a proposed flight mission of the UAV in an airspace;
add one or more predefined points to the flight plan to create an enhanced flight plan, wherein each predefined point of the one or more predefined points is associated with a set of conditions and a set of locations and wherein a predefined point in the one or more predefined points is associated with a higher-level directive describing an action to be taken by the UAV upon detection of an occurrence of a condition in the set of conditions associated with the predefined point and to deviate from the flight plan, based on the higher-level directive, to a location from the set of locations; and
transmit the enhanced flight plan to the UAV for storage of the predefined points on the UAV while the UAV carries out the proposed flight mission.

* * * * *